US011313993B2

(12) United States Patent
Prochnow et al.

(10) Patent No.: US 11,313,993 B2
(45) Date of Patent: Apr. 26, 2022

(54) SYSTEMS AND METHODS FOR ESTIMATING A LIKELIHOOD OF RESERVOIR PRODUCTIVITY AS A FUNCTION OF POSITION IN A SUBSURFACE VOLUME OF INTEREST

(71) Applicant: CHEVRON U.S.A. INC., San Ramon, CA (US)

(72) Inventors: Shane James Prochnow, Fulshear, TX (US); Michael J. Richey, Houston, TX (US)

(73) Assignee: GoPro, Inc., San Mateo, CA (US)

( * ) Notice: Subject to any disclaimer, the term of this patent is extended or adjusted under 35 U.S.C. 154(b) by 878 days.

(21) Appl. No.: 16/144,778

(22) Filed: Sep. 27, 2018

(65) Prior Publication Data

US 2019/0094414 A1    Mar. 28, 2019

Related U.S. Application Data

(60) Provisional application No. 62/564,349, filed on Sep. 28, 2017.

(51) Int. Cl.
| | | |
|---|---|---|
| G01V 99/00 | (2009.01) | |
| G06N 5/04 | (2006.01) | |
| G06F 17/15 | (2006.01) | |
| G06N 20/00 | (2019.01) | |
| E21B 43/00 | (2006.01) | |
| E21B 47/003 | (2012.01) | |

(52) U.S. Cl.
CPC ............ *G01V 99/005* (2013.01); *E21B 43/00* (2013.01); *E21B 47/003* (2020.05); *G06F 17/15* (2013.01); *G06N 5/046* (2013.01); *G06N 20/00* (2019.01)

(58) Field of Classification Search
CPC ...... G01V 99/005; G06N 20/00; G06N 5/046; G06F 17/15; E21B 47/003; E21B 43/00
USPC .......................................................... 703/10
See application file for complete search history.

(56) References Cited

U.S. PATENT DOCUMENTS

| | | | |
|---|---|---|---|
| 6,662,185 B1 * | 12/2003 | Stark | A01G 7/00 |
| 7,254,091 B1 * | 8/2007 | Gunning | G01V 11/00 |
| | | | 367/73 |
| 9,146,903 B2 * | 9/2015 | Thorne | G06K 9/6256 |
| 9,201,164 B2 * | 12/2015 | Thorne | G01V 99/005 |
| 9,355,070 B2 * | 5/2016 | Thorne | G01V 99/005 |

(Continued)

OTHER PUBLICATIONS

Glinsky et al. (Integration of uncertain subsurface information into multiple reservoir simulation models, bhpbilliton, 2005, pp. 1-29) (Year: 2005).*

(Continued)

*Primary Examiner* — Iftekhar A Khan
(74) *Attorney, Agent, or Firm* — Esplin & Associates, PC

(57) ABSTRACT

Exemplary implementations may: obtain subsurface data and well data of the subsurface volume of interest; obtain a parameter model; obtain a spatial correlation model; use the subsurface data and the well data to generate multiple production parameter maps; apply the parameter model to the multiple production parameter maps to generate production likelihood values; apply the spatial correlation model to the subsurface data and the well data to generate parameter continuity values; generate a representation of the likelihood of reservoir productivity as a function of position in the subsurface volume of interest; and display the representation.

15 Claims, 26 Drawing Sheets

(56) References Cited

U.S. PATENT DOCUMENTS

| | | | |
|---|---|---|---|
| 10,288,766 B2* | 5/2019 | Pyrcz | G01V 99/005 |
| 10,364,662 B1* | 7/2019 | Basu | G06N 20/00 |
| 10,415,349 B2* | 9/2019 | Ranjan | G06Q 10/0637 |
| 10,621,500 B2* | 4/2020 | Dusterhoft | G06N 20/00 |
| 11,092,715 B2* | 8/2021 | Prochnow | G01V 99/005 |
| 2004/0148147 A1 | 7/2004 | Martin | |
| 2009/0319243 A1* | 12/2009 | Suarez-Rivera | G06T 17/05 703/10 |
| 2010/0185424 A1 | 7/2010 | Massonnat | |
| 2010/0191514 A1* | 7/2010 | Massonnat | G01V 11/00 703/2 |
| 2011/0011595 A1* | 1/2011 | Huang | E21B 43/00 166/369 |
| 2011/0119040 A1* | 5/2011 | McLennan | G06F 17/18 703/2 |
| 2012/0010865 A1* | 1/2012 | Benson | G01V 11/00 703/10 |
| 2013/0096897 A1* | 4/2013 | Shahri | G01V 1/308 703/10 |
| 2013/0218537 A1* | 8/2013 | Le Ravalec | G06G 7/57 703/2 |
| 2013/0318141 A1* | 11/2013 | Maucec | G06F 17/147 708/402 |
| 2014/0067353 A1* | 3/2014 | Shelley | E21B 43/26 703/10 |
| 2014/0310634 A1* | 10/2014 | McLellan | G06F 3/04847 715/771 |
| 2014/0350856 A1* | 11/2014 | Lambie | G01W 1/10 702/3 |
| 2014/0365409 A1* | 12/2014 | Burch | G06N 20/00 706/12 |
| 2015/0284811 A1* | 10/2015 | Knight | E21B 49/086 506/2 |
| 2016/0042272 A1* | 2/2016 | Mohaghegh | E21B 43/30 706/19 |
| 2016/0090825 A1* | 3/2016 | Imhof | E21B 43/00 703/10 |
| 2016/0259088 A1* | 9/2016 | Carvajal | E21B 41/00 |
| 2016/0356125 A1* | 12/2016 | Bello | G06Q 10/067 |
| 2017/0096881 A1* | 4/2017 | Dusterhoft | G06N 7/005 |
| 2017/0108617 A1* | 4/2017 | Fei | E21B 43/00 |
| 2017/0316128 A1* | 11/2017 | Huang | G06F 30/20 |
| 2017/0342828 A1* | 11/2017 | Dumont | G06F 30/17 |
| 2018/0188403 A1* | 7/2018 | Halsey | G01V 1/306 |
| 2018/0202264 A1* | 7/2018 | Sarduy | G06N 7/00 |
| 2018/0231681 A1* | 8/2018 | Katterbauer | G01V 3/02 |
| 2018/0321421 A1* | 11/2018 | Halabe | G01V 1/30 |
| 2018/0335538 A1* | 11/2018 | Dupont | G06Q 50/02 |
| 2019/0024494 A1* | 1/2019 | Maher | G06N 3/02 |
| 2019/0025461 A1* | 1/2019 | Wiener | G01V 1/306 |
| 2019/0094403 A1* | 3/2019 | Prochnow | G01V 1/46 |
| 2019/0094414 A1* | 3/2019 | Prochnow | E21B 47/003 |
| 2019/0120998 A1* | 4/2019 | Prochnow | G01V 99/005 |
| 2019/0169962 A1* | 6/2019 | Aqrawi | G01V 1/50 |
| 2019/0179983 A1* | 6/2019 | Prochnow | E21B 41/00 |
| 2019/0251460 A1* | 8/2019 | Lam | G06F 30/20 |
| 2020/0124753 A1 | 4/2020 | Halsey | |
| 2021/0087921 A1* | 3/2021 | Prochnow | E21B 43/00 |
| 2021/0231834 A1* | 7/2021 | Prochnow | G06F 30/27 |

OTHER PUBLICATIONS

Bakay et al. (Integrating Geostatistical Modeling with Machine Learning for Production Forecast in Shale Reservoirs: Case Study from Eagle Ford, 2019, URTeC, pp. 1-16) (Year: 2019).*

Breiman, L. (2001). Random forests: Machine Learning 45, 5-12.

Hastie, T., Tibshirani, R., Friedman, J. (2009). The Elements of Statistical Leaning: Data Mining, Inference, and Prediction (2nd Ed). Springer, New York, 745 p.

Prochnow, S.J., Luk, H., Jones, M. Richey, M. (2017). Spatial Continuity and Surveillance Recommendations in the Permian Basin Tight Rock Wolfcamp: Autocorrealtion and Vario gram Analysis for Determining Extent of Reservoir Homogeneity: Unconventional Resources Technology Conference (URTeC) Manuscript 2669992 DOI 10.15530/urtec-2017-2669992. 17 pages.

Wicker, J., Courtier, J., and Curth, P. (2016). Multivariate Analytics of Seismic Inversion Products to Predict Horizontal Production in the Wolf camp Formation of the Midland Basin: Unconventional Resources Technology Conference, San Antonio, Texas, Aug. 2016, Paper URTeC: 2449798. 9 pages.

Zhong, M., Schuetter, J., Mishra, S., and Lafollette, R., (2015). Do Data-Mining Methods Matter? A Wolfcamp Shale Case Study: SPE Hydraulic Fracturing Technology Conference, The Woodlands, Texas, USA, Feb. 2015, SPE 173334. 12 pages.

Kursa, "Boruta forthose in a hurry," May 21, 2020, downloaded from internet [https://cran.r-project.org/web/packages/Boruta/ vignettes/inahurry.pdf], downloaded Feb. 24, 2021 (Year: 2020), 6 pages.

International Application No. PCT/US18/50892, International Search Report and Written Opinion, dated Dec. 6, 2018; 12 pages.

Mickaele Le Ravalec: "Optimizing Well Placement With equality Maps Derived From Multifidelity Meta-models", EAGE Annual Conference 8. Exhibition Incorporating SPE Europe, SPE, No. SPE 154416, Jun. 4, 2812 (2012-86-84), pp. 1-18, XP887921328.

Arinkoola Akeem 0. et al: "quantifying uncertainty in infill well placement using numerical simulation and experimental design: case study", Journal of Petroleum Exploration and Production Technology, [Online] vol. 6, No. 2, Jun. 7, 2815 (2815-86-87), pp. 281-215, XP855882787, I SSN: 2198-8558, DOI:18.1887/s13282-815-8188-z internet Retrieved from the Internet: URL:http: //link.springer.corn/content/pdf/18. 1087/ s13202-015-0180-z.pd f& [retrieved on May 10, 2021].

Mohaghegh Shahab D. et al: "Modeling, History Matching, Forecasting and Analysis of Shale Reservoirs performance Using Artificial Intelligence", SPE Digital Energy Conference and Exhibition, 19 Apr. 1, 2811 (Apr. 19, 2011), XP055776143, DO I: 18. 2118/143875-MS.

J.R. Gilman et al: "SPE 77374 Statistical Ranking of Stochastic Geomodels Using Streamline Simulation: A Field Application", Sep. 29, 2002 (2802-89-29), pp. 1-11, XP855317886, Retrieved from the Internet: URL:https://www.onepetro.org/download/conference-paper/SPE-77374-MS?id=conference-paper/SPE-77374-MS [retrieved on Nov. 9, 2016].

Lashin "Reservoir parameter estimation using well logging data and production history of the Kaldarholt geothermal field, S-Iceland", United Nations University., UNU Geothermal Training Programme, Iceland. Report; Dec. 2005, 2005. Retrieved on Oct. 26, 2018, Retrieved from internet <URL: https://rafhladan.is/handle/10802/7936> entire document. (38 pages).

International Application No. PCT/US2018/050639, International Search Report and Written Opinion dated Nov. 9, 2018 (9 pages).

International Application No. PCT/US2018/050624, International Search Report and Written Opinion dated Nov. 15, 2018 (9 pages).

* cited by examiner

Spatial Autocorrelation Index

Moran's I is calculated:

$$I = \frac{n}{So} \frac{\sum_{i=1}^{n} \sum_{j=1}^{n} W_{i,j} z_i z_j}{\sum_{i=1}^{n} z_i^{\wedge 2}} \quad (1)$$

Spatial autocorrelation is the degree of correlation between pairs of observed values and the spatial distance between those observations (Cliff and Ord, 1981).

Where $Z_i$ is the deviation of an attribute for feature $i$ from its mean $(x_i\text{-}X)$, $W_{ij}$ is the spatial weight between feature $I$ and $j$, $n$ is equal to the total number of features, and So is the aggregate of all the spatial weights as in equation (2).

$$So = \sum_{i=1}^{n} \sum_{j=1}^{n} W_{i,j} \quad (2)$$

(Moran, 1950; Getis and Ord, 1992)

FIG. 7

Spatial Autocorrelation: Moran's I

- "Everything is related to everything else, but near things are more related than distant things."
- Spatial autocorrelation measures degree of correlation with geographic space.
- Null hypothesis is *Complete Spatial Randomness* (CSR)
- Moran's I can be classified as: positive, negative and no spatial auto-correlation.
- Positive spatial autocorrelation is when similar values cluster together in a map.
- Negative spatial autocorrelation is when dissimilar values cluster together in a map
- Interpret Moran's I Index value in light of both a z-score and p-value to evaluate it significance.

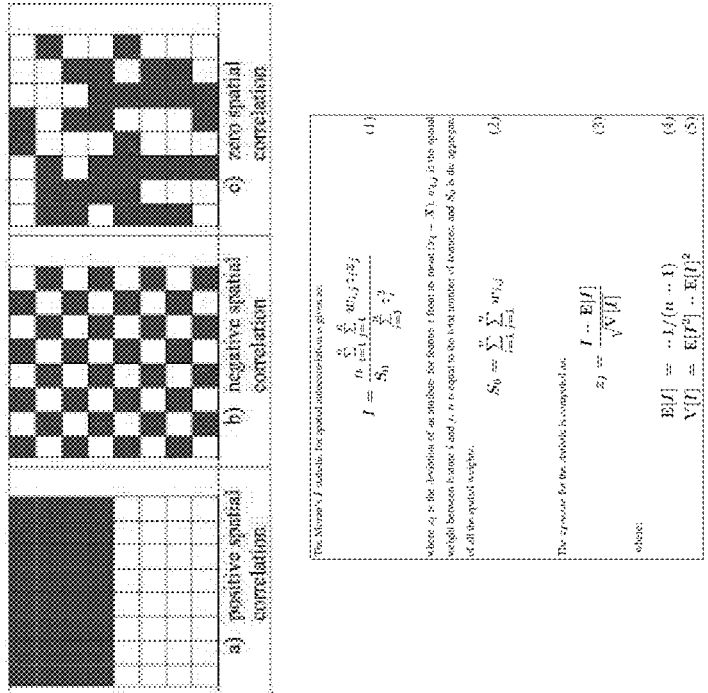

FIG. 8

Spatial Autocorrelation Interpretation

The Spatial Autocorrelation (Global Moran's I) tool is an inferential statistic, which means that the results of the analysis are always interpreted within the context of its null hypothesis. The null hypothesis states that the attribute being analyzed is randomly distributed among the features in your study area; said another way, the spatial processes promoting the observed pattern of values is random chance.

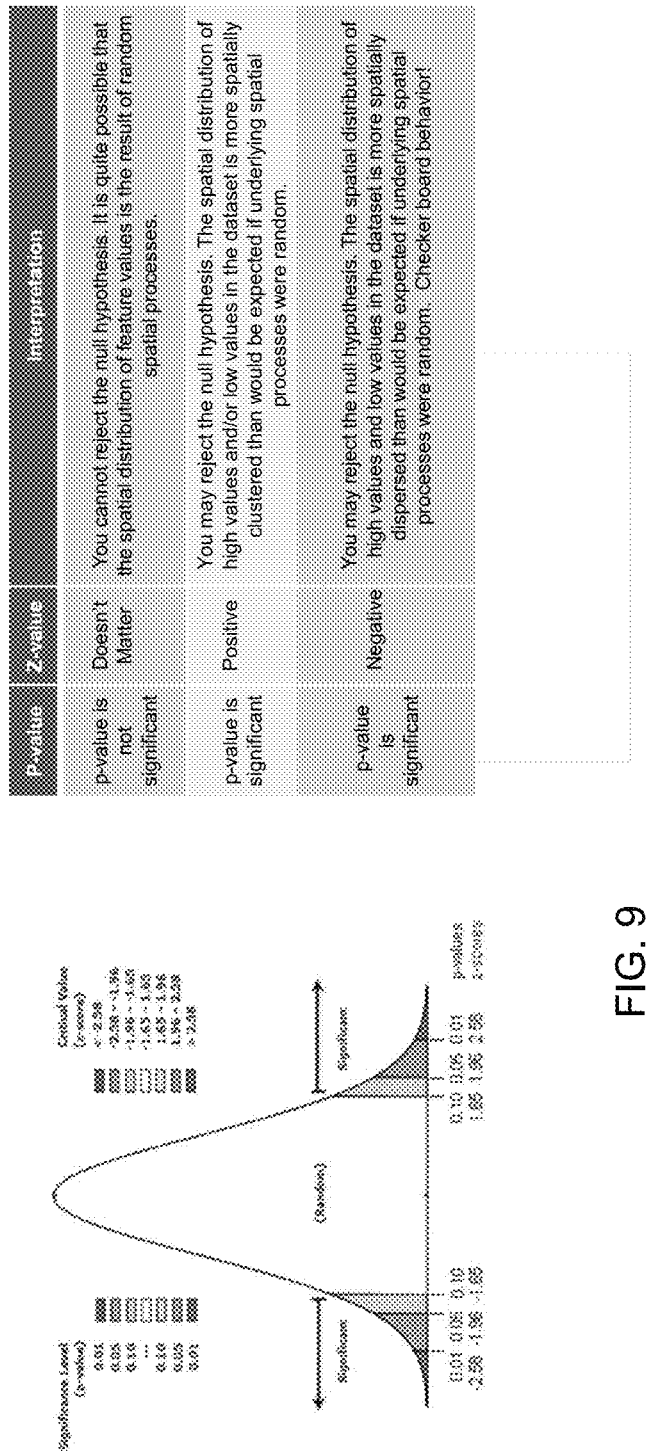

FIG. 9

Incremental Spatial Autocorrelation

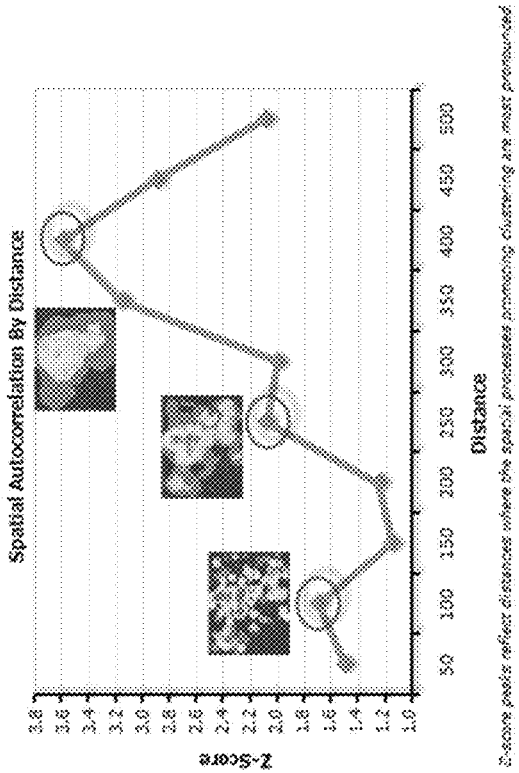

- Measures spatial autocorrelation for a series of distances.
- A line graph of those distances and their corresponding z-scores reflect the intensity of spatial clustering, and peak scores indicate distances where spatial processes promoting clustering are most pronounced.
- These peak distances are often appropriate values to use for tools with a Distance Band or Distance Radius parameter.
- When more than one statistically significant peak is present, clustering is pronounced at each of those distances.
- Select the peak distance that best corresponds to the scale of analysis you are interested in; often this is the first statistically significant peak encountered.

FIG. 10

Incremental Spatial Autocorrelation: Shale Production
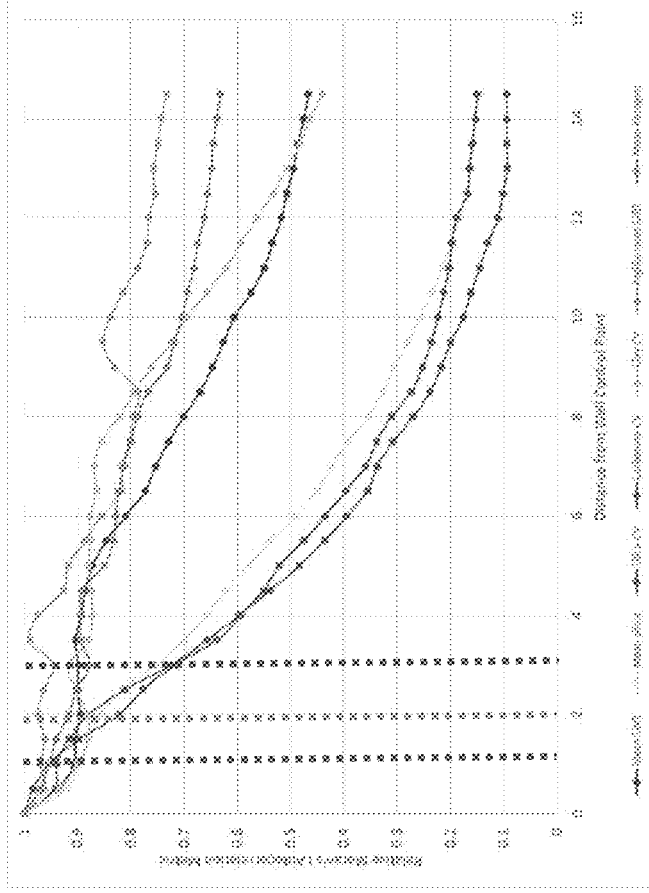
- 10% loss in relative autocorrelation occurs at 1.0 miles from control points
- 20% loss at 2.0 miles
- 30% loss at 3.0 miles
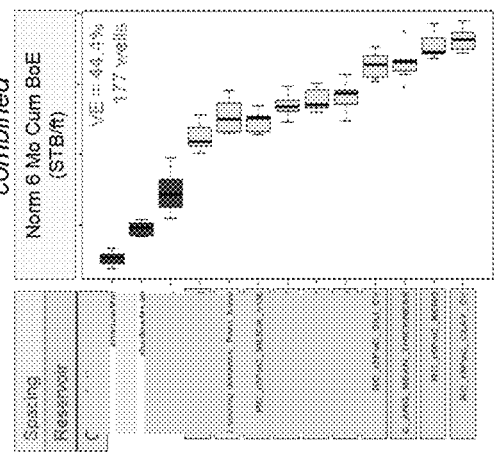
FIG. 13

Coefficient of Variation Variogram Analysis

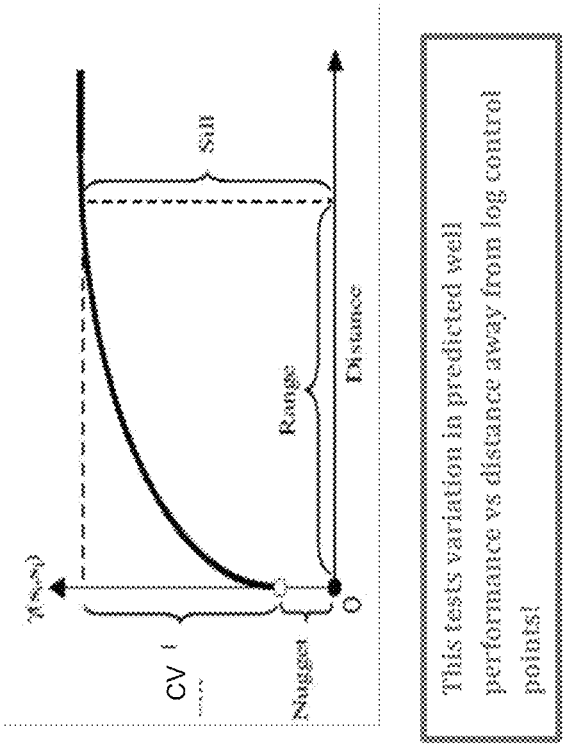

- The distance between each of approximately 350,000 RFM prediction locations and its nearest, well log control point was determined using the ArcGIS "Near" tool

- The distances to nearest well log control points were binned into 1,000 ft (304.8 m) increments.

The coefficient of variation (CV) was calculated for each distance bin using the following formula:

$$CV = \frac{\sigma}{\mu} \quad (3)$$

Where $\sigma$ is the standard deviation ($P_{33.3}$-$P_{66.6}$) of RFM model predictions within the distance increment, and $\mu$ is the mean value of the RFM model predictions within the distance increment.

FIG. 14

SYSTEMS AND METHODS FOR ESTIMATING A LIKELIHOOD OF RESERVOIR PRODUCTIVITY AS A FUNCTION OF POSITION IN A SUBSURFACE VOLUME OF INTEREST

FIELD OF THE DISCLOSURE

The present disclosure relates to systems and methods for estimating a likelihood of reservoir productivity as a function of position in a subsurface volume of interest.

SUMMARY

An aspect of the present disclosure relates to a method. The method may include obtaining, from the non-transient electronic storage, subsurface data and well data of the subsurface volume of interest. The subsurface data and the well data include production parameter values for multiple production parameters as a function of position in the subsurface volume of interest, thereby characterizing subsurface production features that affect the reservoir productivity. The method may include obtaining, from non-transient electronic storage, a parameter model. The parameter model may have been conditioned by training an initial parameter model using training data. The training data may include (i) the well data of one or more wells in the subsurface volume of interest and (ii) the production parameter values for corresponding multiple production parameters affecting productivity of the one or more wells as a function of position in the subsurface volume of interest. The method may include obtaining, from the non-transient electronic storage, a spatial correlation model. The method may include using, with the one or more physical computer processors, the subsurface data and the well data to generate multiple production parameter maps. A given production parameter map may represent the production parameter values for the given production parameter as a function of time and position in the subsurface volume of interest. The method may include applying, with the one or more physical computer processors, the parameter model to the multiple production parameter maps to generate production likelihood values specifying likelihoods of reservoir productivity as a function of position in the subsurface volume of interest. The method may include applying, with the one or more physical computer processors, the spatial correlation model to the subsurface data and the well data to generate parameter continuity values specifying changes in the production parameters and reservoir productivity as a function of position in the subsurface volume of interest. The method may include generating, with the one or more physical computer processors, a representation of the likelihood of reservoir productivity as a function of position in the subsurface volume of interest using visual effects to depict at least a portion of the production likelihood values and the parameter continuity values as a function of position in the subsurface volume of interest. The method may include displaying, via the graphical user interface, the representation.

An aspect of the present disclosure relates to a system. The system may include one or more hardware processors configured by machine-readable instructions. The processor(s) may be configured to obtain, from the non-transient electronic storage, subsurface data and well data of the subsurface volume of interest. The subsurface data and the well data include production parameter values for multiple production parameters as a function of position in the subsurface volume of interest, thereby characterizing subsurface production features that affect the reservoir productivity. The processor(s) may be configured to obtain, from non-transient electronic storage, a parameter model. The parameter model may have been conditioned by training an initial parameter model using training data. The training data may include (i) the well data of one or more wells in the subsurface volume of interest and (ii) the production parameter values for corresponding multiple production parameters affecting productivity of the one or more wells as a function of position in the subsurface volume of interest. The processor(s) may be configured to obtain, from the non-transient electronic storage, a spatial correlation model. The processor(s) may be configured to use, with the one or more physical computer processors, the subsurface data and the well data to generate multiple production parameter maps. A given production parameter map may represent the production parameter values for the given production parameter as a function of time and position in the subsurface volume of interest. The processor(s) may be configured to apply, with the one or more physical computer processors, the parameter model to the multiple production parameter maps to generate production likelihood values specifying likelihoods of reservoir productivity as a function of position in the subsurface volume of interest. The processor(s) may be configured to apply, with the one or more physical computer processors, the spatial correlation model to the subsurface data and the well data to generate parameter continuity values specifying changes in the production parameters and reservoir productivity as a function of position in the subsurface volume of interest. The processor(s) may be configured to generate, with the one or more physical computer processors, a representation of the likelihood of reservoir productivity as a function of position in the subsurface volume of interest using visual effects to depict at least a portion of the production likelihood values and the parameter continuity values as a function of position in the subsurface volume of interest. The processor(s) may be configured to display, via the graphical user interface, the representation.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the presently disclosed technology. As used in the specification and in the claims, the singular form of "a", "an", and "the" include plural referents unless the context clearly dictates otherwise.

The technology disclosed herein, in accordance with one or more various implementations, is described in detail with reference to the following figures. The drawings are provided for purposes of illustration only and merely depict typical or example implementations of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

BRIEF DESCRIPTION OF THE DRAWINGS

FIG. 7 illustrates an example spatial autocorrelation model, in accordance with one or more implementations.

FIG. 8 illustrates how an example spatial autocorrelation model may be evaluated, in accordance with one or more implementations.

FIG. 9 illustrates how an example spatial autocorrelation model may be evaluated, in accordance with one or more implementations.

FIG. 10 illustrates an example output of an example spatial autocorrelation model, in accordance with one or more implementations.

FIG. 13 illustrates an example output of an example spatial autocorrelation model, in accordance with one or more implementations.

FIG. 14 illustrates an example variogram analysis, in accordance with one or more implementations.

DETAILED DESCRIPTION

Figure 1A:
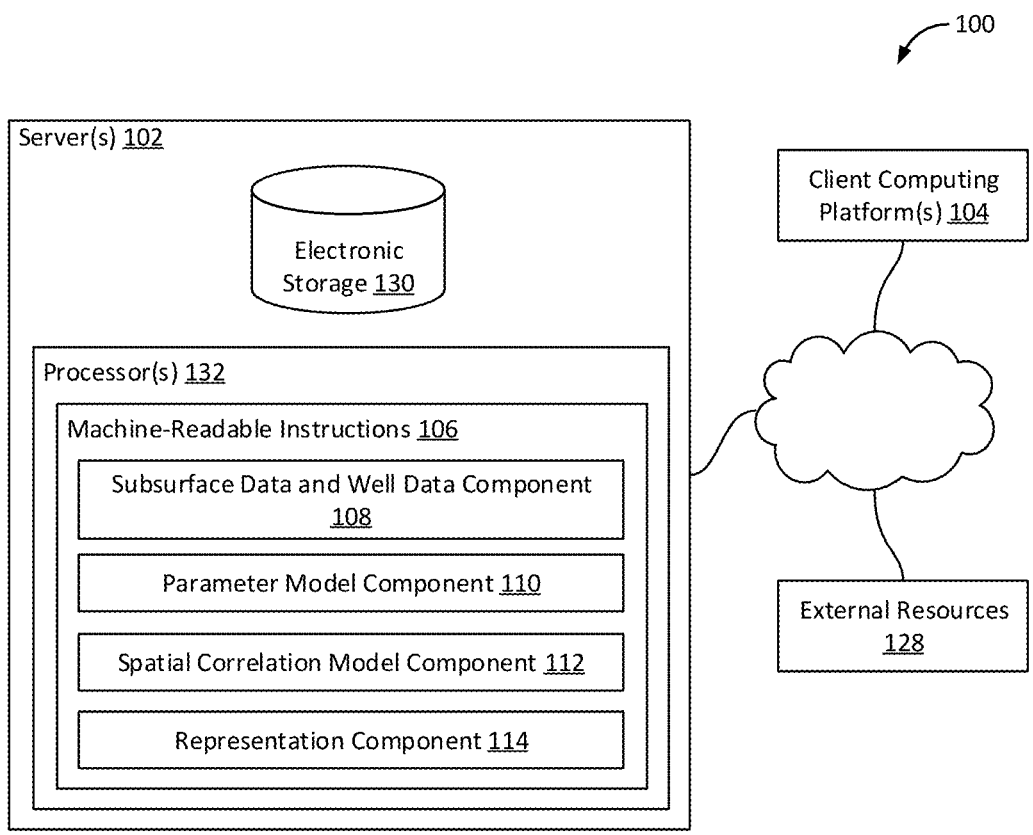
FIG. 1A shows a system configured to estimate a likelihood of reservoir productivity as a function of position in a subsurface volume of interest, in accordance with one or more implementations.

Reference will now be made in detail to various implementations, examples of which are illustrated in the accompanying drawings. Numerous specific details are set forth in order to provide a thorough understanding of the present disclosure and the implementations disclosed herein. However, implementations described herein may be practiced without these specific details. In other instances, well-known methods, procedures, components, and mechanical apparatuses have not been described in detail so as not to unnecessarily obscure aspects of the implementations.

Well and uncertainty planning in hydrocarbon reservoirs may involve characterization of the reservoir, including an understanding of the reservoir continuity. Existing approaches for reservoir continuity assessment may rely on inferential relationships between wells. These methods fail to accurately describe reservoir continuity or reservoir heterogeneity that is desirable for assessing risk and economic productivity. The presently disclosed technology may use random forest models and spatial correlation to determine meaningful reservoir homogeneity in a subsurface volume of interest. A subsurface volume of interest may include any area, region, and/or volume underneath a surface. Such a volume may include, or be bounded by, one or more of a water surface, a ground surface, and/or other surfaces. In implementations, the presently disclosed technology may be able to estimate reservoir a likelihood of reservoir productivity for tight rock and unconventional plays, among other reservoirs. The presently disclosed technology may facilitate the identification of regions with insufficient density of reservoir data sampling required for practical assessment through multivariate data analysis and 3D geologic modeling. The presently disclosed technology may provide a basis for unconventional play assessment in the sense of establishing zones of risk regarding the economic viability of a reservoir. Moreover, the presently disclosed technology quantifies reservoir variability, uncertainty, and risk.

Well productivity in unconventional reservoirs may be spatially correlated but variable and noisy. Existing technologies may utilize coarse geographic—and subjective type curve neighborhoods to represent changing reservoir productivity and risk across large subsurface volumes of interest in hydrocarbon producing basins. For existing technologies, the correspondence between the spatial extent of reservoir properties and expected well productivity within the type curve neighborhoods may often be inferential and rarely closely correlated. Bootstrap techniques like random forest models, may be able to estimate well productivity at any resolution and can demonstrate the changing producibility of reservoirs across a hydrocarbon basin but fall short of a comprehensive understanding of the subsurface. In the presently disclosed technology, the random forest models may be combined with spatial correlation from autocorrelation and variograms, both of which can be automated with software code. The combination of random forest models and spatial correlation may allow a more accurate estimate of a subsurface volume of interest.

Accordingly, systems and methods configured to estimate a likelihood of reservoir productivity as a function of position in a subsurface volume of interest are disclosed. The disclosed technology may use a combination of predictive data analytics, spatial correlations, as will be described herein. The disclosed technology may identify zones of consistent reservoir potential with a level of likelihood (e.g. 90%), and the average rate of reservoir change with distance away from sampling control points. This may enable practitioners to measure and determine the best distance setback from a reservoir control point to consider similar reservoir conditions.

FIG. 1A illustrates a system 100, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of a subsurface data and well data component 108, a parameter model component 110, a spatial correlation model component 112, a representation component 114, and/or other instruction components.

Figure 1B:
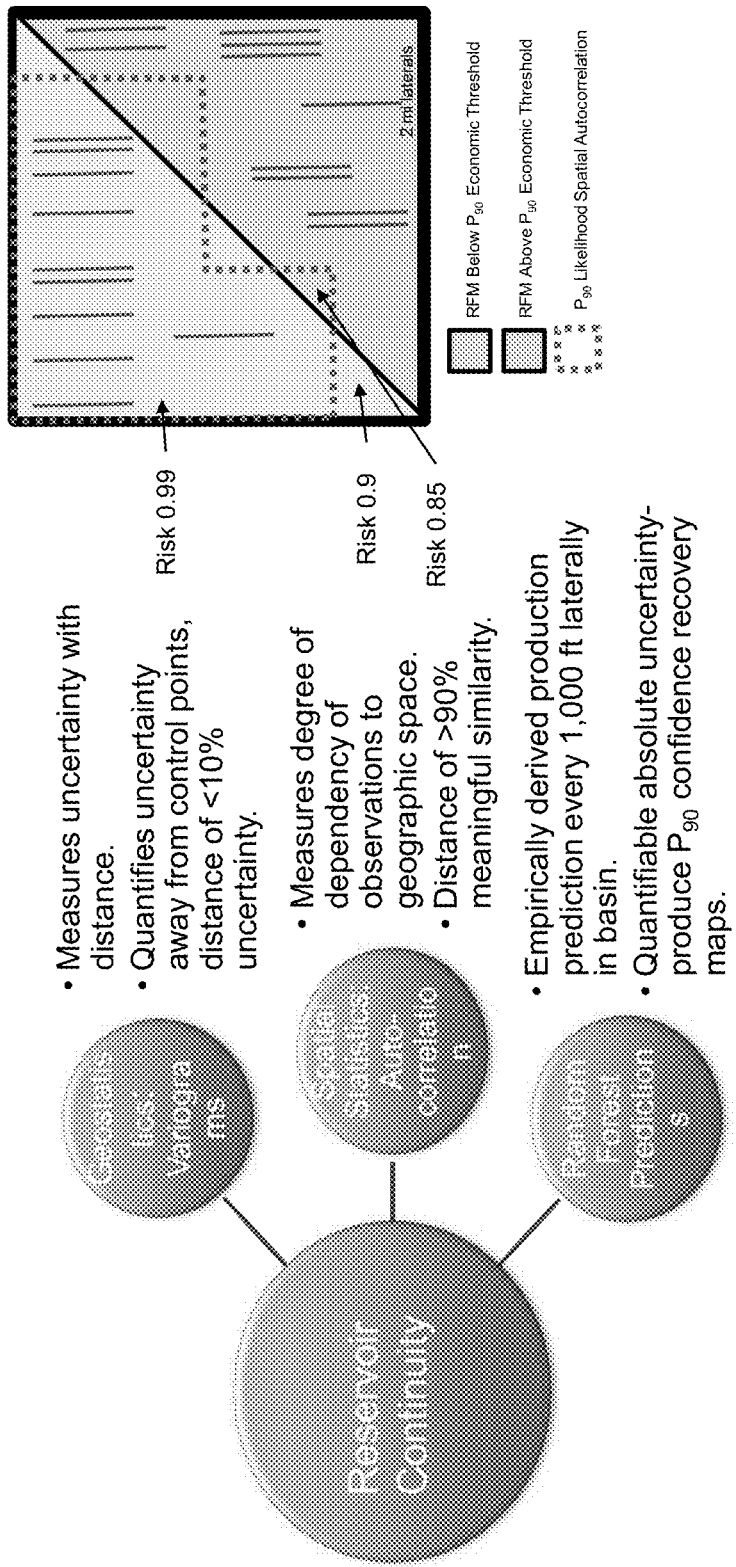
FIG. 1B illustrates a flowchart of a method of hydrocarbon reservoir continuity assessment, in accordance with some implementations.
Figure 6:
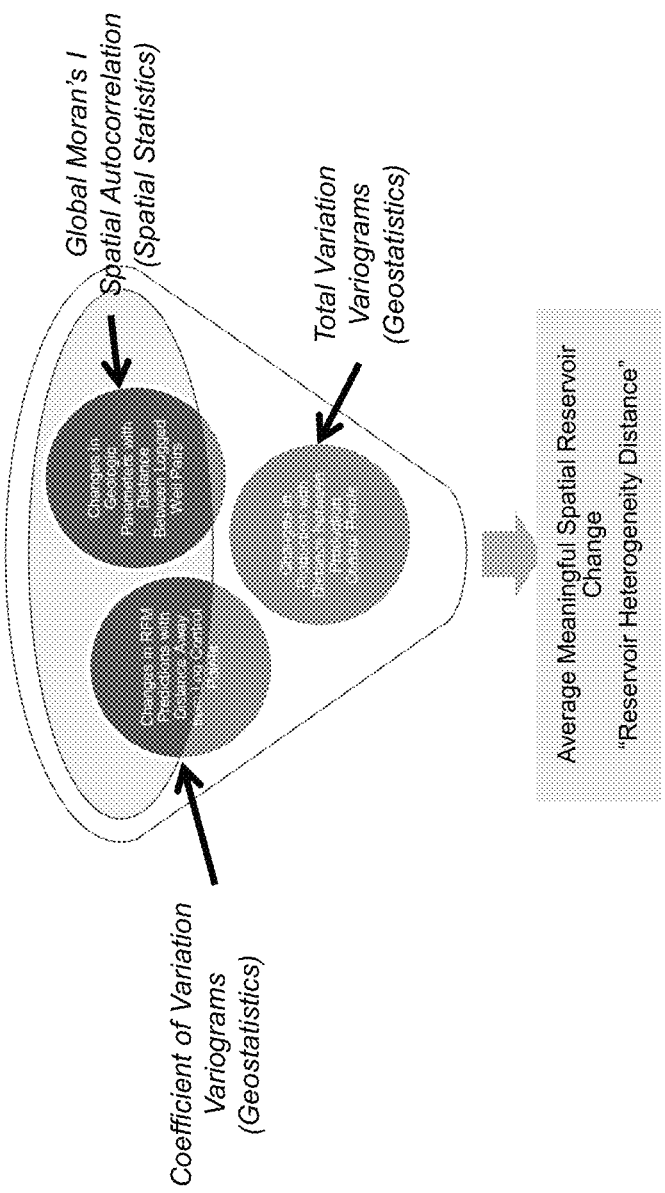
FIG. 6 illustrates the multiple models used to estimate a likelihood of reservoir productivity as a function of position in a subsurface volume of interest, in accordance with one or more implementations.

FIG. 1B illustrates a flowchart of a method of hydrocarbon reservoir continuity assessment, in accordance with some implementations. The flowchart may be implemented in system FIG. 1A. As shown, the spatial correlation, such as geostatistics, including variograms, may provide a means for measuring uncertainty with distance. In an implementation, the spatial correlation may be used to determine the distance away from the control points at which the uncertainty becomes 10% or greater. The spatial correlations may allow the method to measure the degree of dependency of, for example, production parameters, to geographic space. In an implementation, the spatial correlations may be used to determine the distances from control points at which the meaning similarity is greater than a threshold value (e.g., 90%). A contribution to the method may be the random forest model. Random forest predictions can empirically derive production predictions over a spatial array of the field, thereby quantifying the absolute uncertainty. In an implementation, the random forest predictions can be used to determine threshold values (P10, P50, P90). The combination of the three analyses can be used to make interpretations of reservoir continuity and risk between well locations and surrounding the wells. FIG. 6 may present a general view of the multiple models used to estimate a likelihood of reservoir productivity as a function of position in a subsurface volume of interest, in accordance with one or more implementations.

Referring back to FIG. 1A, subsurface data and well data component 108 may be configured to obtain subsurface data and well data of the subsurface volume of interest. The subsurface data and/or the well data may be obtained from the non-transient electronic storage and/or other sources. The subsurface data and the well data include production parameter values for multiple production parameters as a function of position in the subsurface volume of interest, thereby characterizing subsurface production features that affect the reservoir productivity.

The subsurface data may include geological data and reservoir data. Geological data may include petrophysical, core, cutting, pressure, drilling property, mudlog, seismic properties, and/or other geological data. In some implementations, the reservoir data may be interpolated using cokriging, autocorrelation gridding techniques, and/or other techniques. Well data may include completion data and production data. Completion data may include well perforation lengths, proppant intensity, fluid types, well spacing, number of frac stages, and/or other completion data. Production data may include cumulative oil, gas, and/or water production at different time intervals, such as, for example, 6 month or 18 month cumulative standard barrels of oil equivalent produced.

By way of non-limiting example, the subsurface production features may include one or more petrophysical, core, cutting, pressure, drilling property, mudlog, seismic features, well perforation lengths, proppant intensity, fluid types, well spacing, number of fracturing stages, cumulative oil production over a time interval, cumulative gas production over a time interval, cumulative water production over a time interval, and/or other features.

Subsurface data and well data component 108 may be configured to use the subsurface data and the well data to generate multiple production parameter maps. This may be accomplished by the one or more physical computer processors. A given production parameter map may represent the production parameter values for the given production parameter as a function of time and position in the subsurface volume of interest.

Parameter model component 110 may be configured to obtain a parameter model. The parameter model may be obtained from the non-transient electronic storage and/or other sources. The parameter model may be conditioned by using training data on an initial parameter model. The training data may include multiple sets of well data specifying multiple production parameters based on multiple wells. The training data may include the well data of one or more wells in the subsurface volume of interest and the production parameter values for corresponding multiple production parameters affecting productivity of the one or more wells as a function of position in the subsurface volume of interest. The parameter model may include random forest algorithms and/or other machine learning algorithms. In implementations, the random forest algorithm may be able to use a large collection of uncorrelated regression trees and average the uncorrelated regression trees.

Figure 2:
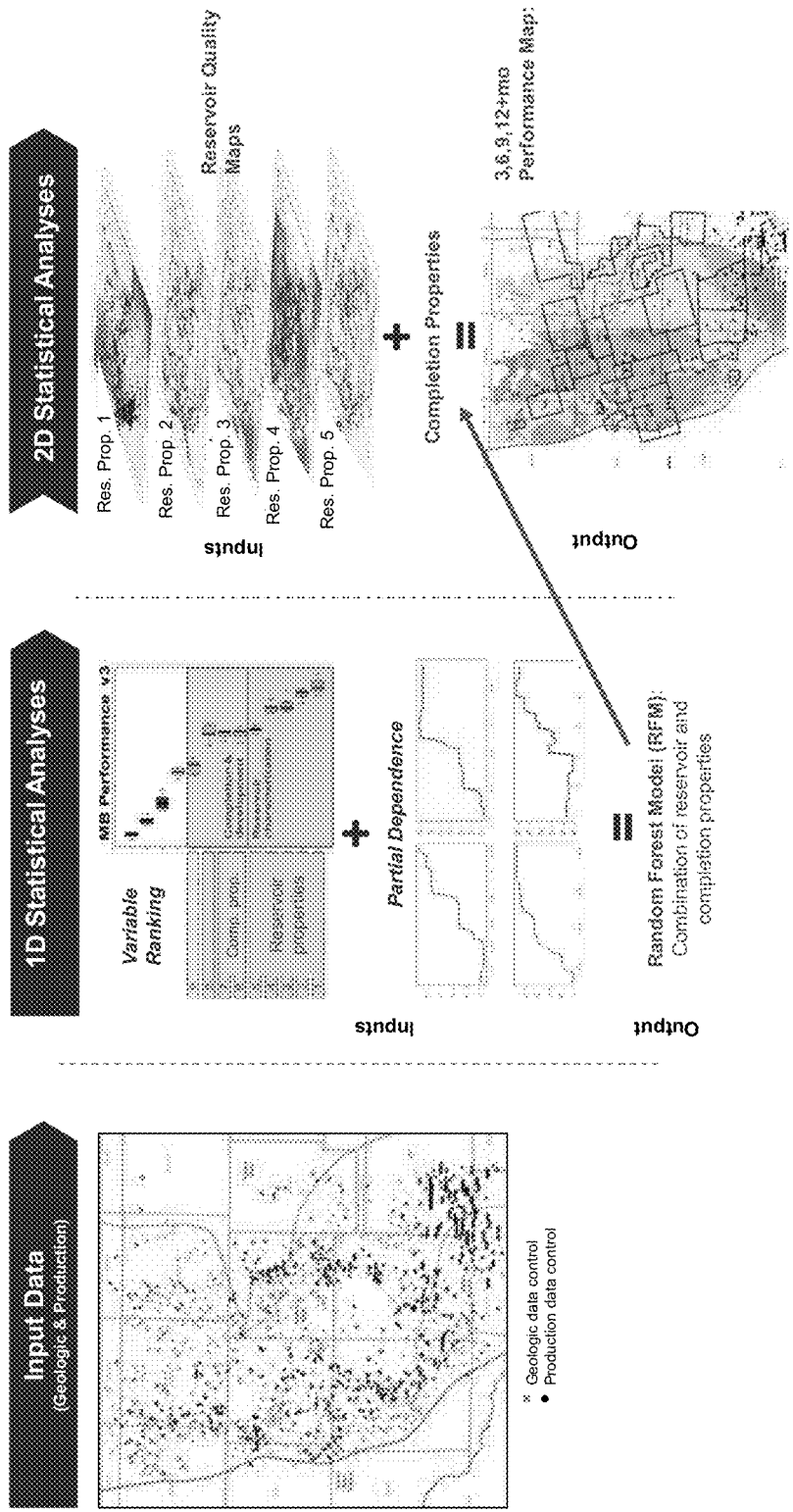
FIG. 2 illustrates a workflow of using an example parameter model to generate production likelihood maps, in accordance with one or more implementations.

For example, FIG. 2 illustrates a flowchart of a method for random forest analysis of a subterranean hydrocarbon reservoir, in accordance with one or more implementations. The left column shows the input data, which may include geological data and well data.

Figure 3:
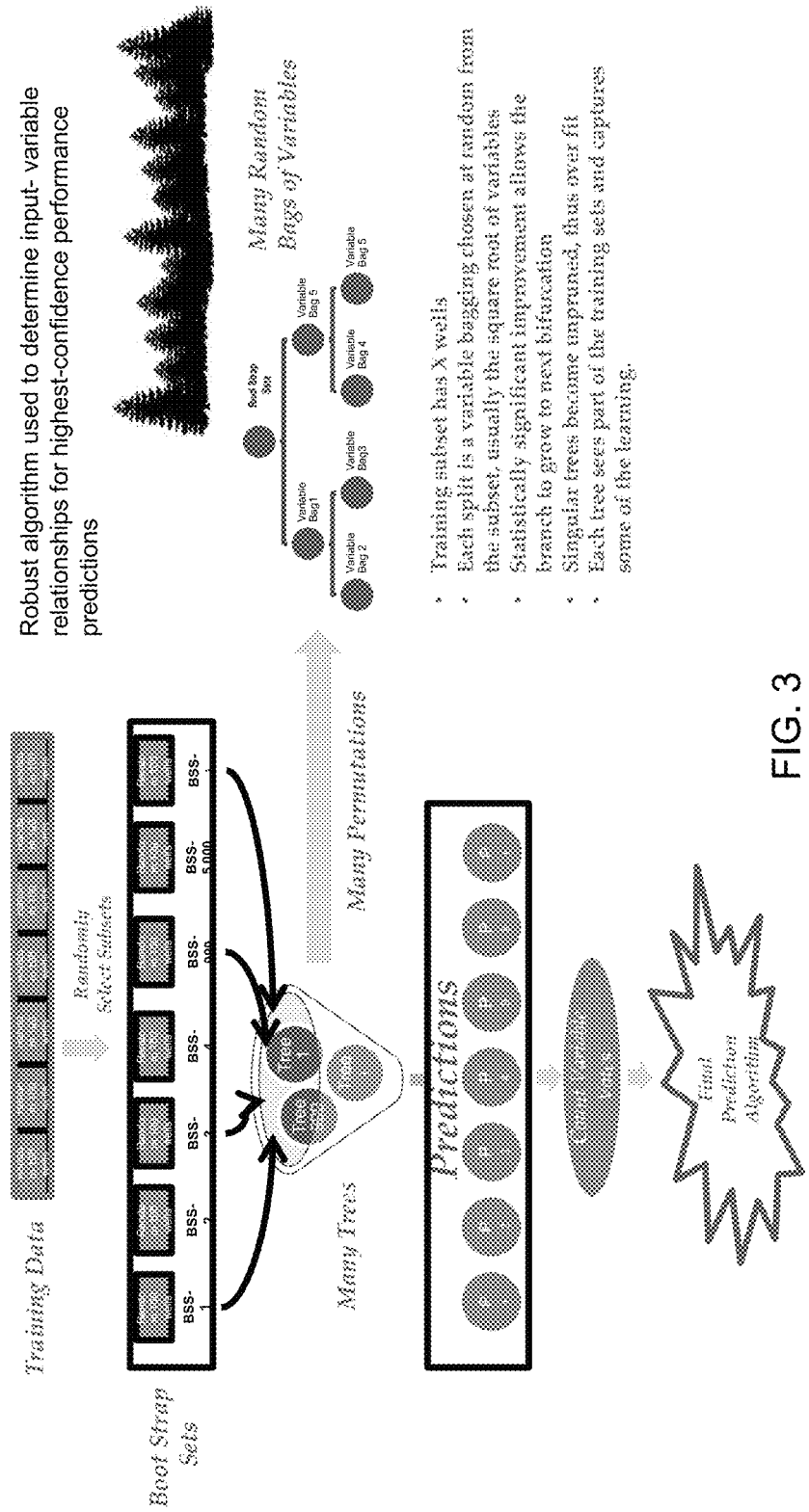
FIG. 3 illustrates training an initial parameter model to generate a parameter model, in accordance with one or more implementations.
Figure 4:
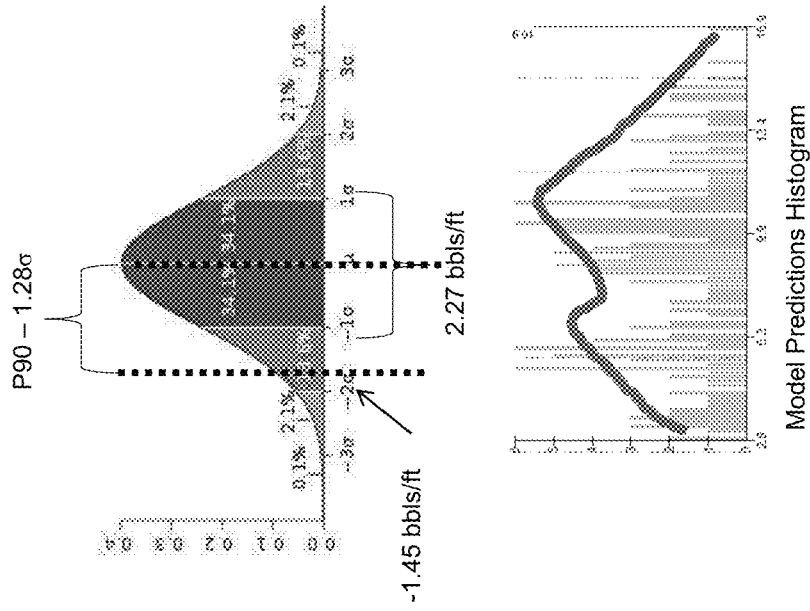
FIG. 4 illustrates an example method to determine P90, in accordance with one or more implementations.
Figure 5:
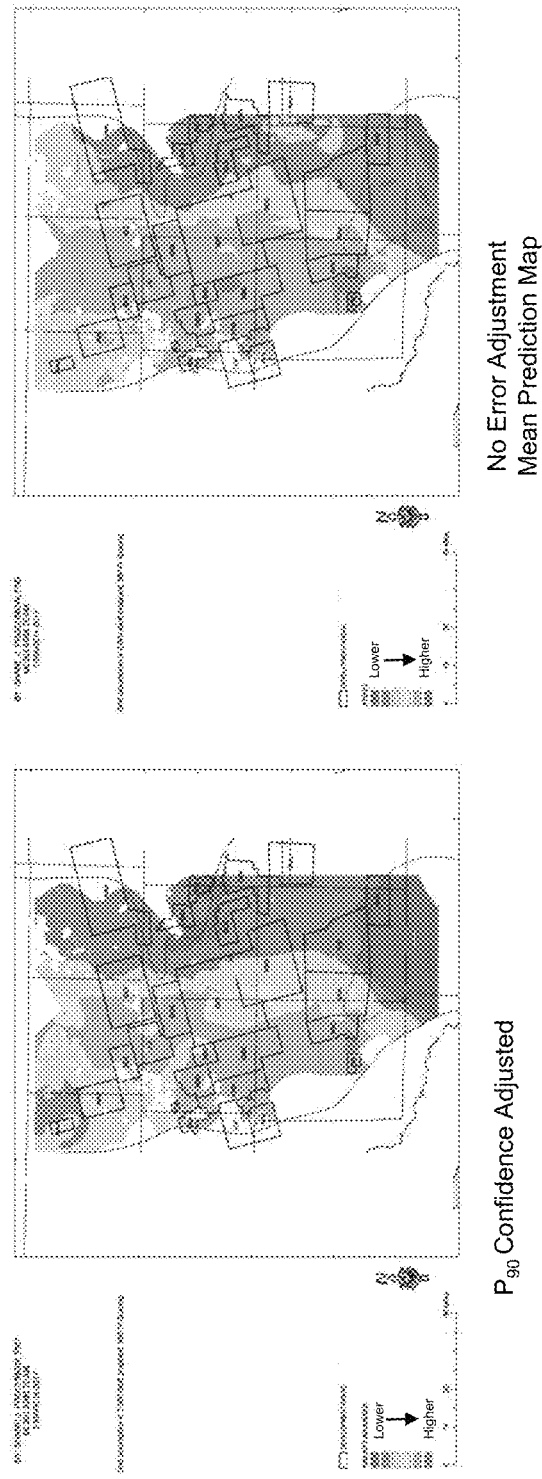
FIG. 5A illustrates an example production likelihood map, in accordance with one or more implementations.
FIG. 5B illustrates an example production likelihood map, in accordance with one or more implementations.

Random forest models may have a low risk of overfitting, allowing for extreme randomization and multiple iterations, as shown in FIG. 3, illustrating one implementation to train a random forest model from an initial random forest model. Random forest machine learning is a modification of bootstrap aggregation that builds on a large collection of uncorrelated regression trees and then may average them. Bootstrap aggregation may average many noisy but unbiased models to reduce prediction variance. Regression trees are ideal candidates for bootstrap aggregation, because they can capture complex interaction structures. The random forest model may use many boot strap sets and many regression trees to generate many predictions, which may be averaged together to provide a trained random forest model. This may identify the most impactful and statistically significant production parameters that account for differences in well production. This may identify the most impactful and statistically significant subsurface production parameters that account for differences in long-term well production as seen in the center column of FIG. 2. The production parameters identified by the random forest models may be individually evaluated in order to identify thresholds, trends, rules, and/or other conditions that impact well productivity. In implementations, the production parameters may be used to generate production parameter graphs. The production parameter graphs may indicate the marginal effect of a given production parameter on productivity. The production parameter graphs can be used to generate multiple production likelihood maps at different times, such as 3 months, 6 months, etc., as shown in the right column of FIG. 2. The multiple production likelihood maps can be validated by blind testing. FIGS. 4, 5A, and 5B are additional examples of the results of random forest models illustrating the transformation from P50 to P90.

Referring to FIG. 4, the parameter model may be able to generate likelihood values, such as, for example, P90, P50, P10, and/or other likelihood values. For example, referring to FIG. 4, P90 may be 1.455 barrels/ft, indicating there is about a 90% likelihood a given reservoir in a subsurface volume of interest will produce at least 1.455 barrels/ft. This estimate may be used in FIG. 5A. FIG. 5A illustrates a production likelihood map that has not been adjusted based on a likelihood of reservoir productivity. FIG. 5B illustrates a production likelihood map that has been adjusted based on P90. As depicted, the economically viable areas have shrunk because the productivity map has become more accurate. Here, there is less likelihood of productivity over the whole range originally depicted in FIG. 5A.

Referring back to FIG. 1A, parameter model component 110 may be configured to apply the parameter model to the multiple production parameter maps to generate production likelihood values specifying likelihoods of reservoir productivity as a function of position in the subsurface volume of interest. This may be accomplished by the one or more physical computer processors. Production likelihood values may include a certainty or confidence level corresponding to an estimated reservoir productivity, as described above with respect to P90. In implementations, the production likelihood values may be used to generate production likelihood maps, as described herein, (e.g, FIG. 5B).

In implementations, parameter model component 110 may be configured to apply the parameter model to the multiple production parameter maps to generate multiple refined production parameters. This may be accomplished by the one or more physical computer processors. The multiple refined production parameters may include refined production parameter values. The multiple refined production parameters may be a subset of the multiple production parameters. The parameter model may have been trained, as described herein, to identify one or more of the multiple production parameters that have the greatest effect on productivity compared to the other multiple production parameters.

In implementations, the refined production parameter values may be used to generate multiple production parameter graphs. A given refined production parameter graph may specify refined production parameter values corresponding to a given refined production parameter as a function of estimated well productivity. Thresholds, trends, rules, and/or other conditions may be determined or applied to the multiple production parameter graphs to generate constrained production parameters that may include corresponding constrained production parameter values. The thresholds, trends, rules, and/or other conditions may be identified or determined using linear analysis, non-linear analysis, rate of change analysis, machine learning, and/or other techniques. The constrained production parameter values may include a subset of the refined production parameter values. The production likelihood values may be generated using the refined production parameter values.

Parameter model component 110 may be configured to train an initial parameter model using existing well data and corresponding multiple production parameters, as described herein. This may be accomplished by the one or more physical computer processors.

Figure 18:
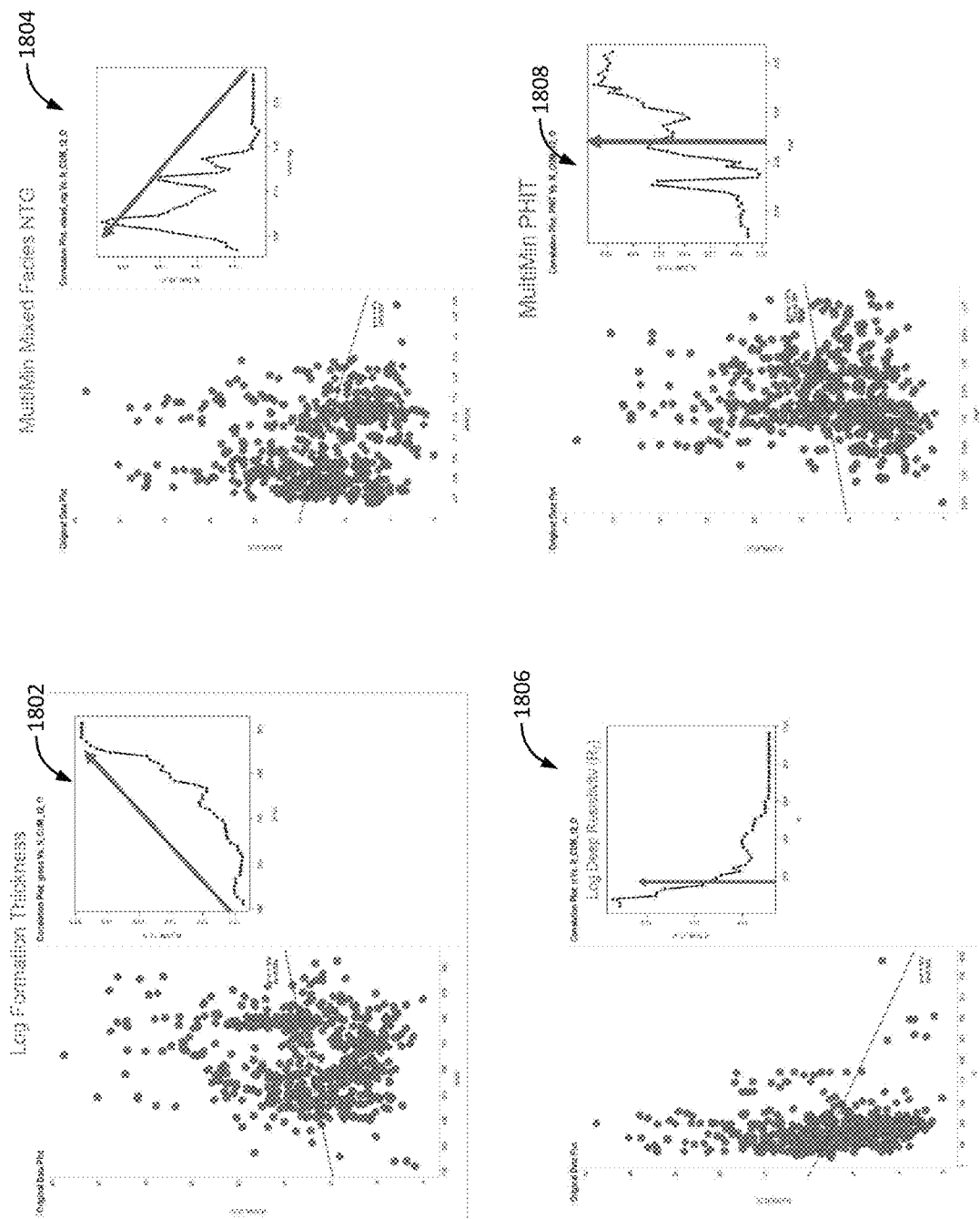
FIG. 18 illustrates example production parameter graphs, in accordance with one or more implementations.

Parameter model component 110 may be configured to limit the production likelihood values based on the production likelihood values exceeding a threshold value to generate limited production likelihood values. This may be accomplished by the one or more physical computer processors. In implementations, user input options may be presented to a user to input threshold values or rules identified by the user in the production parameter graphs, as illustrated in FIG. 18, described herein. A given production parameter may have one or more threshold values or a specified range of values based on the corresponding production parameter graphs. The limited production likelihood values may be limited based on what likelihood a user may need (e.g., P50, P90, etc.). The limited production likelihood values may be a subset of the production likelihood values.

Referring back to FIG. 1A, spatial correlation model component 112 may be configured to obtain a spatial correlation model. The spatial correlation model may be obtained from the non-transient electronic storage, and/or other sources. The spatial correlation model may include spatial autocorrelation and a variogram. Spatial autocorrelation may include global Moran's I, and/or other autocorrelation techniques. Variograms may include CV variograms and/or other variograms.

For example, referring to FIG. 7, global Moran's I may be the degree of correlation between pairs of values and the spatial distance between those values. FIG. 8 illustrates how an example spatial autocorrelation model may be evaluated, in accordance with one or more implementations. In implementations, a subsurface volume of interest may be classified as positive, negative and no spatial autocorrelation. Positive spatial autocorrelation may correspond to one or more positions in a subsurface volume of interest where wells having similar productivity are spatially clustered together. Negative spatial autocorrelation may correspond to one or more positions in a subsurface volume of interest where wells having dissimilar productivity are spatially grouped together. No spatial autocorrelation may correspond to one or more positions in a subsurface volume of interest where wells are randomly distributed. In one example, referring to FIG. 14, variogram analysis may test heterogeneity as a function of position in a subsurface volume of interest. As illustrated, a coefficient of variation may increase as a distance increases.

Referring back to FIG. 1A, spatial correlation model component 112 may be configured to apply the spatial correlation model to the subsurface data and the well data to generate parameter continuity values specifying changes in production parameters and reservoir productivity as a function of position in the subsurface volume of interest. This may be accomplished by the one or more physical computer processors. Parameter continuity values may include global Moran's I values indicating how a production parameter may be correlated as a function of position in a subsurface volume of interest, as described herein, and variograms indicating variation in heterogeneity as a function of position in the subsurface volume of interest, as described herein. Reservoir productivity may be based on reservoir heterogeneity.

Spatial correlation model component 112 may be configured to limit the parameter continuity values based on the parameter continuity values exceeding a threshold value to generate limited parameter continuity values. This may be accomplished by the one or more physical computer processors. The limited parameter continuity values may include a likelihood of similarity of the production parameters and the reservoir productivity as a function of position in the subsurface volume of interest compared to existing wells. In implementations, the similarity may be based on statistical likelihood incorporated into the spatial correlation models. In implementations, the similarity may be selected by a user.

Representation component 114 may be configured to generate a representation of the likelihood of reservoir productivity as a function of position in the subsurface volume of interest using visual effects to depict at least a portion of the production likelihood values and the parameter continuity values as a function of position in the subsurface volume of interest. This may be accomplished by the one or more physical computer processors.

The production likelihoods and the parameter continuity values may be superimposed, overlaid, integrated, combined, and/or otherwise used to generate the representation. The production likelihood values may be used to generate production likelihood maps, which may be maps of the subsurface volume of interest indicating a likelihood of reservoir productivity, as described herein, separated into grids. The production likelihood maps may be classified into groups based on user input (P50, P90, etc., as described herein). The parameter continuity values may be used to further specify a correlation between pairs of values and the distance between those values and/or an uncertainty with a distance from a well. The representation may use visual effects to identify the estimated productive reservoirs in the subsurface volume of interest. In implementations, when overlay is used, a geospatially aware software, such as ArcGIS or Petrel may be appropriate. The area of intersection between the production likelihood values and the parameter continuity values may be interpreted as a zone of reservoir continuity for planning purposes.

In some implementations, a visual effect may include one or more visual transformation of the video content. In some implementations, a visual transformation may include one or more of a visual zoom, a visual filter, a visual rotation, and/or a visual overlay (e.g., text and/or graphics overlay).

Representation component 114 may be configured to generate a refined representation of the likelihood of reservoir productivity as a function of position in the subsurface volume of interest using visual effects to depict at least a portion of the limited production likelihood values and the limited parameter continuity values as a function of position in the subsurface volume of interest. This may be accomplished by the one or more physical computer processors. The refined representation may be a more accurate version of the representation because the production likelihood values and the parameter continuity values have been limited based on the threshold values and/or rules, as described herein.

Representation component 114 may be configured to display the representation and/or the refined representation. The representation and/or the refined representation may be displayed on a graphical user interface and/or other display, In some implementations, server(s) 102, client computing platform(s) 104, and/or external resources 128 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user corresponding to the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1A is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1A as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, and/or 114, and/or other components. Processor(s) 132 may be configured to execute components 108, 110, 112, and/or 114, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1A as being implemented within a single processing unit, in implementations in which processor(s) 132 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 132 may be configured to execute one or more additional components that may perform some or all of the functionality attributed below to one of components 108, 110, 112, and/or 114.

Figure 17:
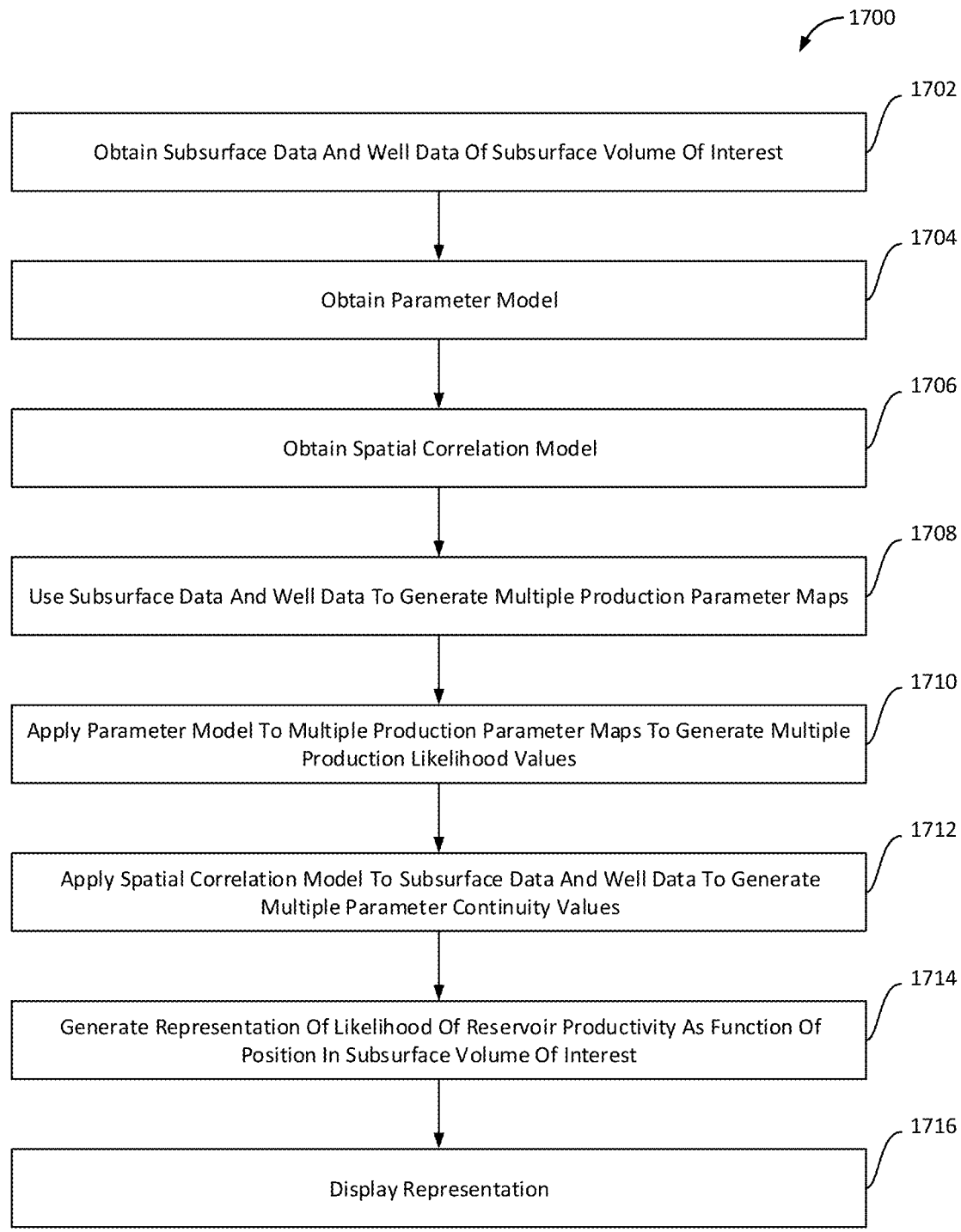
FIG. 17 includes a flow chart of a method to estimate a likelihood of reservoir productivity as a function of position in a subsurface volume of interest, in accordance with one or more implementations.

FIG. 17 illustrates a method 1700 for estimating a likelihood of reservoir productivity as a function of position in a subsurface volume of interest, in accordance with one or more implementations. The operations of method 1700 presented below are intended to be illustrative. In some implementations, method 1700 may be accomplished with one or more additional operations not described, and/or without one or more of the operations discussed. Additionally, the order in which the operations of method 1700 are illustrated in FIG. 17 and described below is not intended to be limiting.

In some implementations, method 1700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1700 in response to instructions stored electronically on an electronic storage medium. The one or more processing devices may include one or more devices configured through hardware, firmware, and/or software to be specifically designed for execution of one or more of the operations of method 1700.

An operation 1702 may include obtaining, from non-transient electronic storage, subsurface data and well data of the subsurface volume of interest. The subsurface data and the well data include production parameter values for multiple production parameters as a function of position in the subsurface volume of interest, thereby characterizing subsurface production features that affect the reservoir productivity. Operation 1702 may be performed by one or more hardware processors configured by machine-readable instructions including a component that is the same as or similar to subsurface data and well data component 108, in accordance with one or more implementations.

An operation 1704 may include obtaining, from non-transient electronic storage, a parameter model. The parameter model may have been conditioned by training an initial parameter model using training data. The training data may include the well data of one or more wells in the subsurface volume of interest and the production parameter values for corresponding multiple production parameters affecting productivity of the one or more wells as a function of position in the subsurface volume of interest. Operation 1704 may be performed by one or more hardware processors configured by machine-readable instructions including a component that is the same as or similar to parameter model component 110, in accordance with one or more implementations.

An operation 1706 may include obtaining, from the non-transient electronic storage, a spatial correlation model. Operation 1706 may be performed by one or more hardware processors configured by machine-readable instructions including a component that is the same as or similar to spatial correlation model component 112, in accordance with one or more implementations.

An operation 1708 may include using, with the one or more physical computer processors, the subsurface data and the well data to generate multiple production parameter maps. A given production parameter map may represent the production parameter values for the given production parameter as a function of time and position in the subsurface volume of interest. Operation 1708 may be performed by one or more hardware processors configured by machine-readable instructions including a component that is the same as or similar to subsurface data and well data component 108, in accordance with one or more implementations.

An operation 1710 may include applying, with the one or more physical computer processors, the parameter model to the multiple production parameter maps to generate production likelihood values specifying likelihoods of reservoir productivity as a function of position in the subsurface volume of interest. Operation 1710 may be performed by one or more hardware processors configured by machine-readable instructions including a component that is the same as or similar to parameter model component 110, in accordance with one or more implementations.

An operation 1712 may include applying, with the one or more physical computer processors, the spatial correlation model to the subsurface data and the well data to generate parameter continuity values specifying changes in the production parameters and reservoir productivity as a function of position in the subsurface volume of interest. Operation 1712 may be performed by one or more hardware processors configured by machine-readable instructions including a component that is the same as or similar to spatial correlation model component 112, in accordance with one or more implementations.

An operation 1714 may include generating, with the one or more physical computer processors, a representation of the likelihood of reservoir productivity as a function of position in the subsurface volume of interest using visual effects to depict at least a portion of the production likelihood values and the parameter continuity values as a function of position in the subsurface volume of interest. Operation 1714 may be performed by one or more hardware processors configured by machine-readable instructions including a component that is the same as or similar to representation component 114, in accordance with one or more implementations.

An operation 1716 may include displaying, via the graphical user interface, the representation. Operation 1716 may be performed by one or more hardware processors configured by machine-readable instructions including a component that is the same as or similar to representation component 114, in accordance with one or more implementations.

Figure 11:
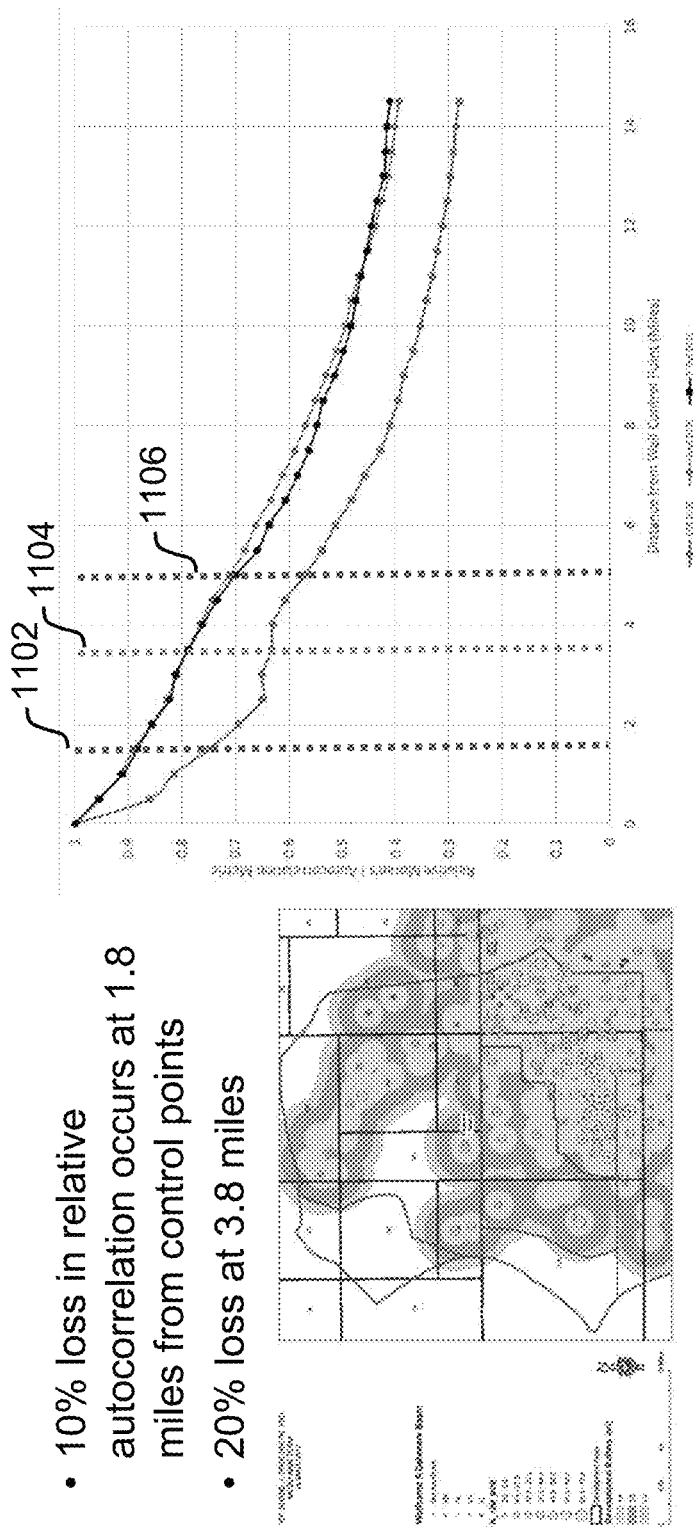
FIG. 11 illustrates an example output of an example spatial autocorrelation model, in accordance with one or more implementations.

FIG. 9 illustrates a distribution curve used to determine which global Moran's I values may be significant, in accordance with one or more implementations. In one example, FIG. 10 illustrates an example output of an example spatial autocorrelation model, in accordance with one or more implementations. Using the subsurface data and the well data a graph comparing distance on an x-axis and z-scores on a y-axis may be generated. Each peak may illustrate a group of wells having similar productivity. FIG. 11 illustrates an example output of an example spatial autocorrelation model, in accordance with one or more implementations. As illustrated, based on multiple production parameters, about a 10% loss of relative autocorrelation occurs at about 1.8 miles, depicted by line 1102. About a 20% loss occurs at about 3.8 miles, or line 1104. About a 30% loss occurs at about 5 miles, or line 1106.

Figure 12:
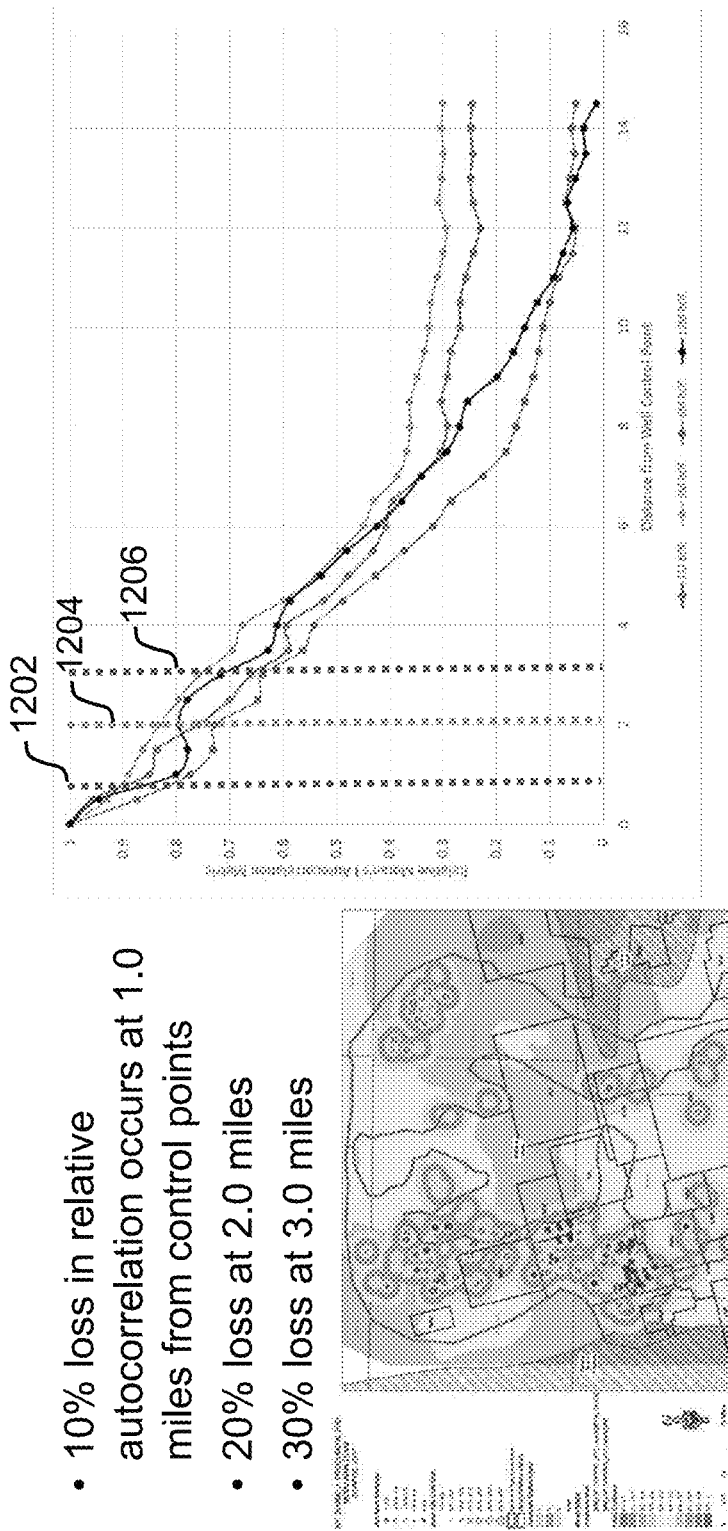
FIG. 12 illustrates an example output of an example spatial autocorrelation model, in accordance with one or more implementations.

FIG. 12 illustrates an example output of an example spatial autocorrelation model, in accordance with one or more implementations. FIG. 12 may depict an autocorrelation analysis for a production parameter (e.g., shale production). As illustrated, about a 10% loss of relative autocorrelation occurs at about 1.0 miles, depicted by line 1102. About a 20% loss occurs at about 2.0 miles, or line 1104. About a 30% loss occurs at about 3.0 miles, or line 1104.

FIG. 13 illustrates an example output of an example spatial autocorrelation model, in accordance with one or more implementations. FIG. 13 may illustrate one or more types of production parameters, such as mean silica, carbonate, clay, kerogen, etc. As illustrated, different production parameters may have varying types of loss at different distances.

Figure 15:
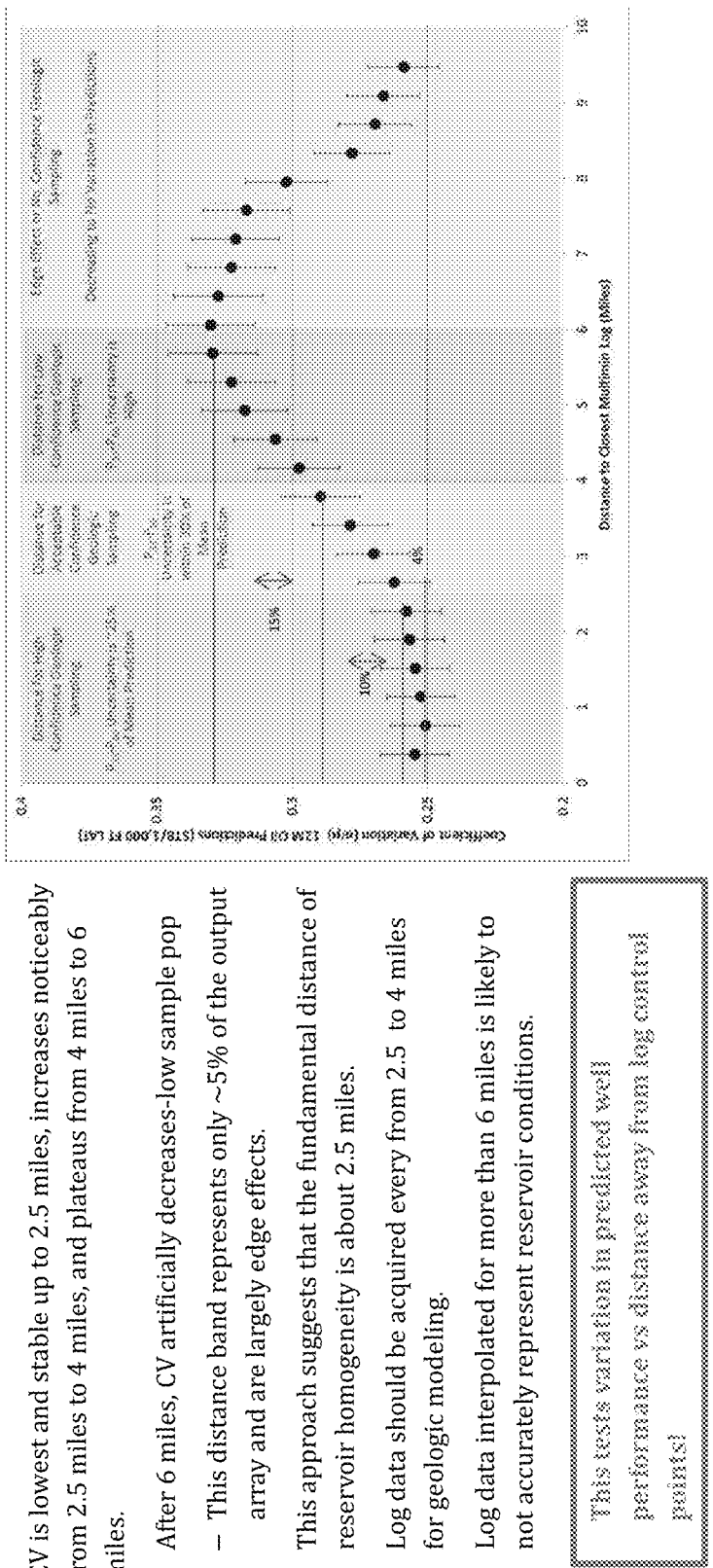
FIG. 15 illustrates an example output of an example variogram model, in accordance with one or more implementations.

FIG. 15 illustrates an example output of an example variogram model, in accordance with one or more implementations. As illustrated, a high likelihood or confidence may be within about 2.5 miles from a log control. This is where the coefficient of variation is lowest and most stable. Between about 2.5 miles to about 4 miles, coefficient of variation increases. Between about 4 miles and about 6 miles, the coefficient of variation peaks at about 6 miles. After 6 miles, the coefficient of variation may decrease due to a low sample population, creating artificial edge effects.

Figure 16:
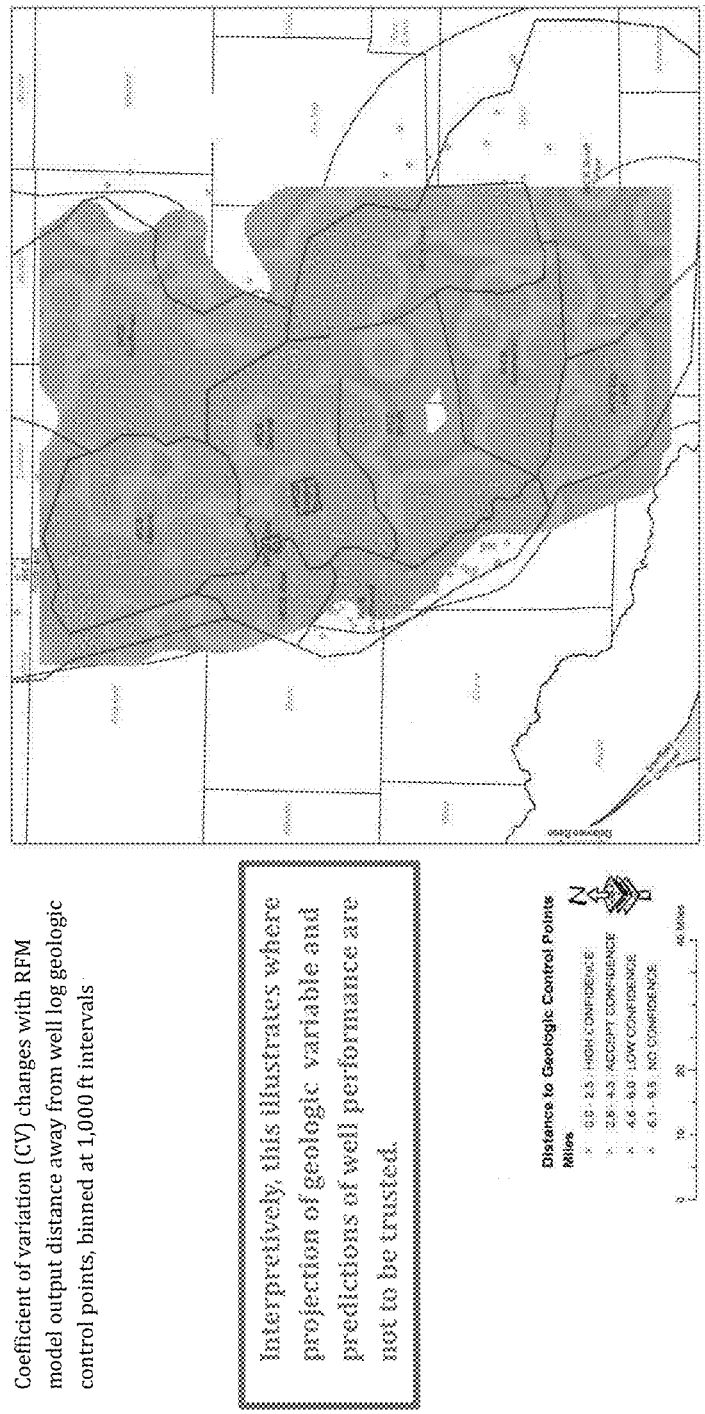
FIG. 16 illustrates an example representation, in accordance with one or more implementations.

FIG. 16 illustrates a map of variogram analysis, in accordance with one or more implementations. As illustrated the map depicts a confidence level or likelihood of well productivity as a function of position in the subsurface volume of interest. Some positions have a higher degree of confidence than other positions in the subsurface volume of interest. The map illustrates there is a correlation between distances from log control points and productivity for the subsurface volume of interest.

FIG. 18 illustrates example production parameter graphs, in accordance with one or more implementations. As illustrated, graph 1802 may indicate a trend that as log values increase, productivity also increases. Graph 1094 may illustrate that as log values decrease, productivity decreases. Graph 1806 may illustrate a threshold after which well productivity is no longer viable. Graph 1808 may illustrate a threshold after which well productivity becomes viable. The system may determine a thresholds, trends, rules, and/or other conditions based on the production parameter graphs based on linear, non-linear analysis, machine learning, etc. In implementations, the system may present the production parameter graphs to a user to visually determine what thresholds, trends, rules, and/or other conditions are present in the production parameter graphs. The system may generate and present one or more user input options to limit production likelihood values based on the production parameter graphs via a graphical user interface (not shown). The system may be able to receive the user input corresponding to the one or more user input options.

Figure 19:
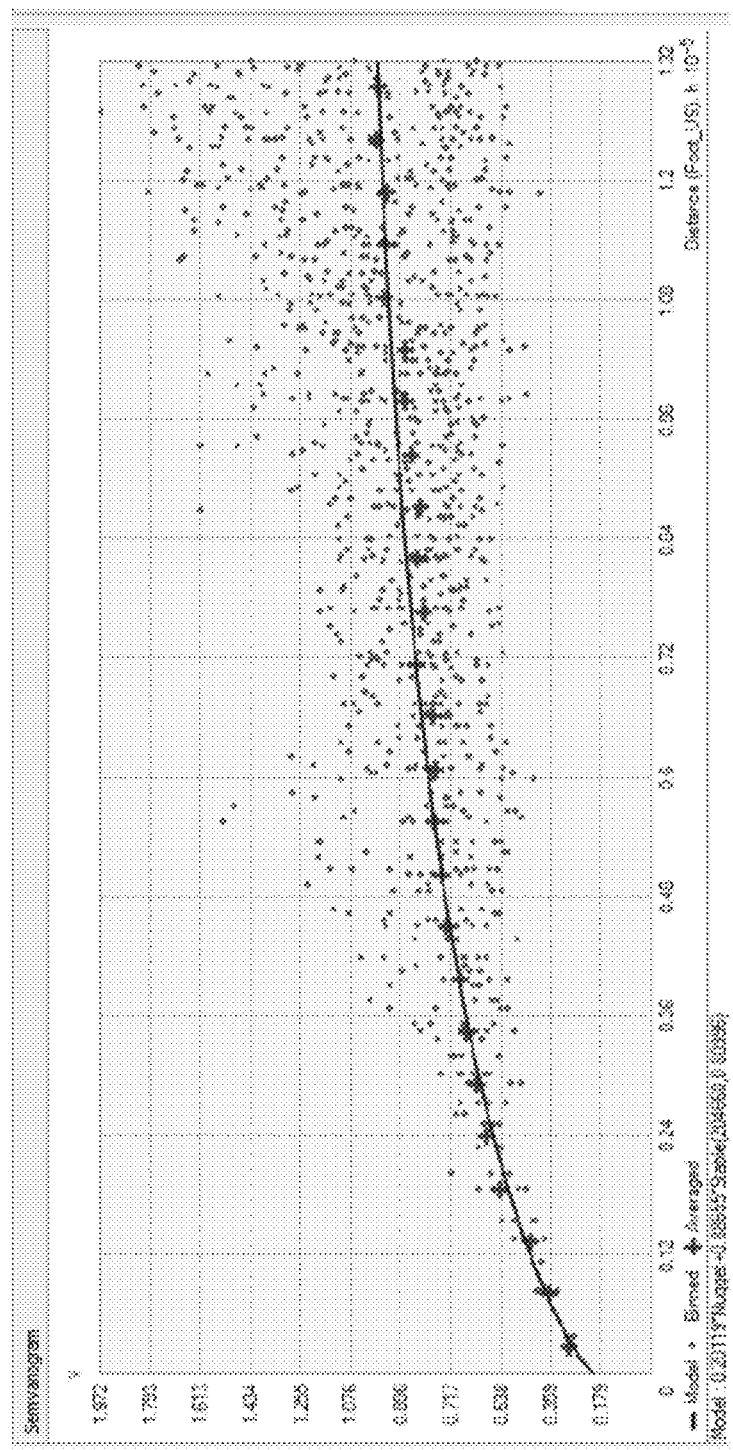
FIG. 19 illustrates an example variogram analysis, in accordance with one or more implementations.

FIG. 19 illustrates an example variogram analysis, in accordance with one or more implementations. The graph may depict a semivariogram of mean silica volume as dots. As the dots spread out more and more, the coefficient of variation also increases accordingly.

Figure 20:
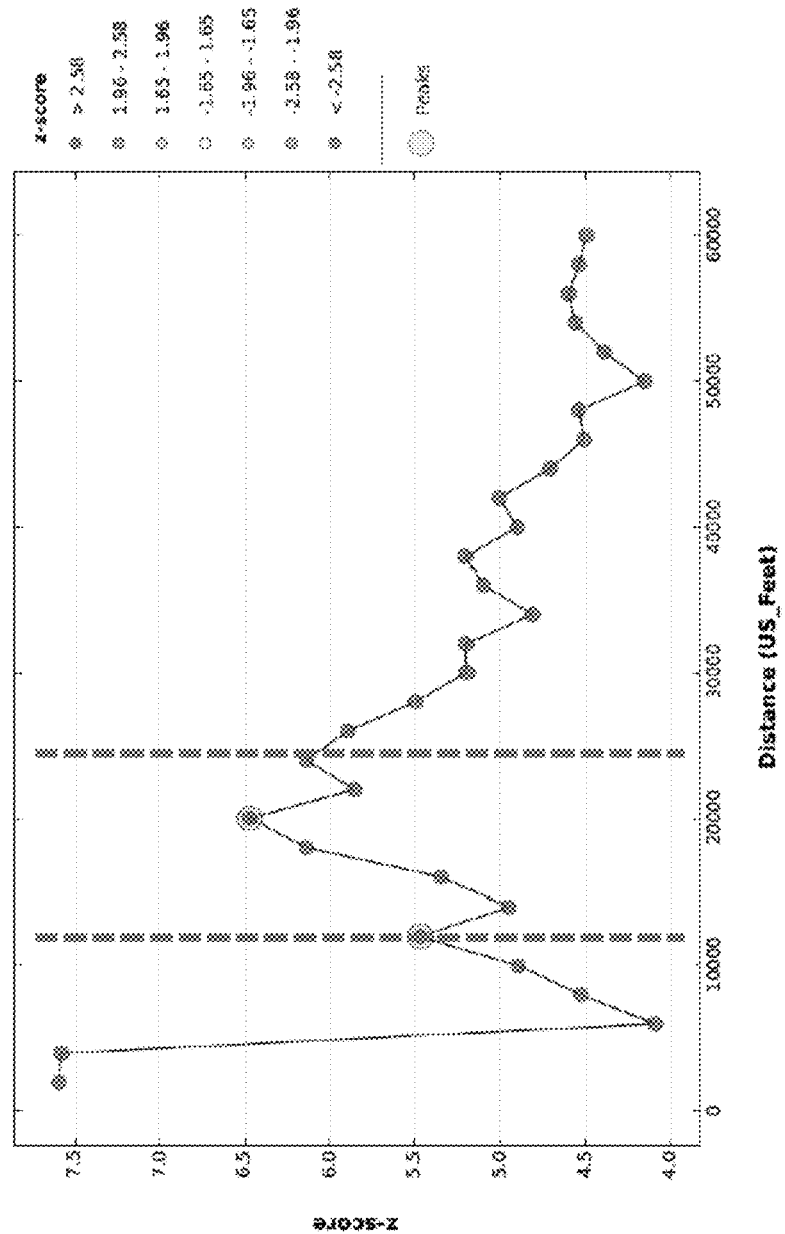
FIG. 20 illustrates an example spatial autocorrelation analysis, in accordance with one or more implementations.
Figure 21:
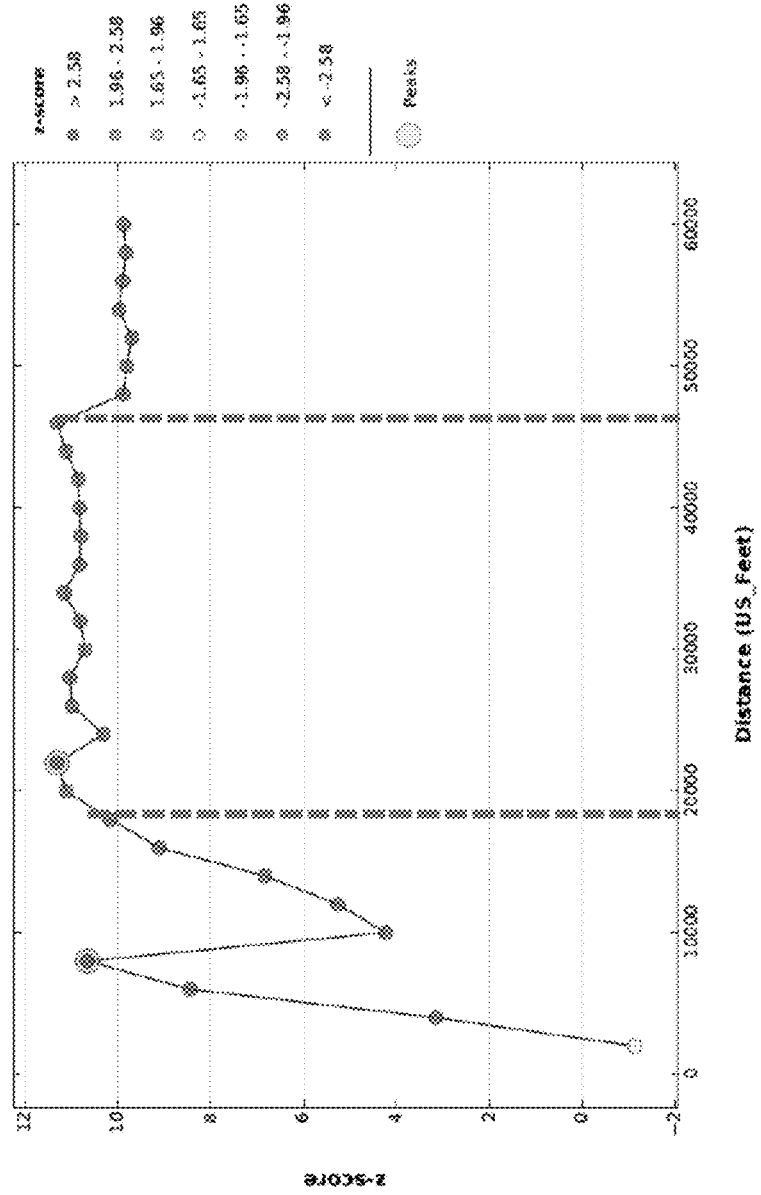
FIG. 21 illustrates an example spatial autocorrelation analysis, in accordance with one or more implementations.
Figure 22:
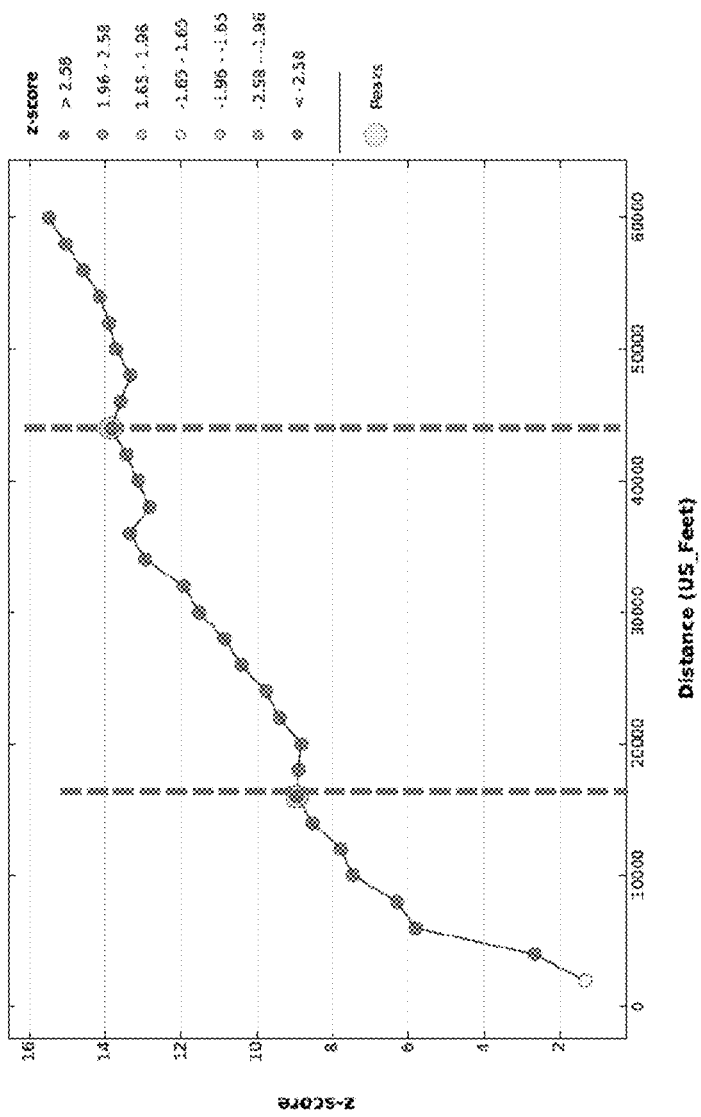
FIG. 22 illustrates an example spatial autocorrelation analysis, in accordance with one or more implementations.
Figure 23:
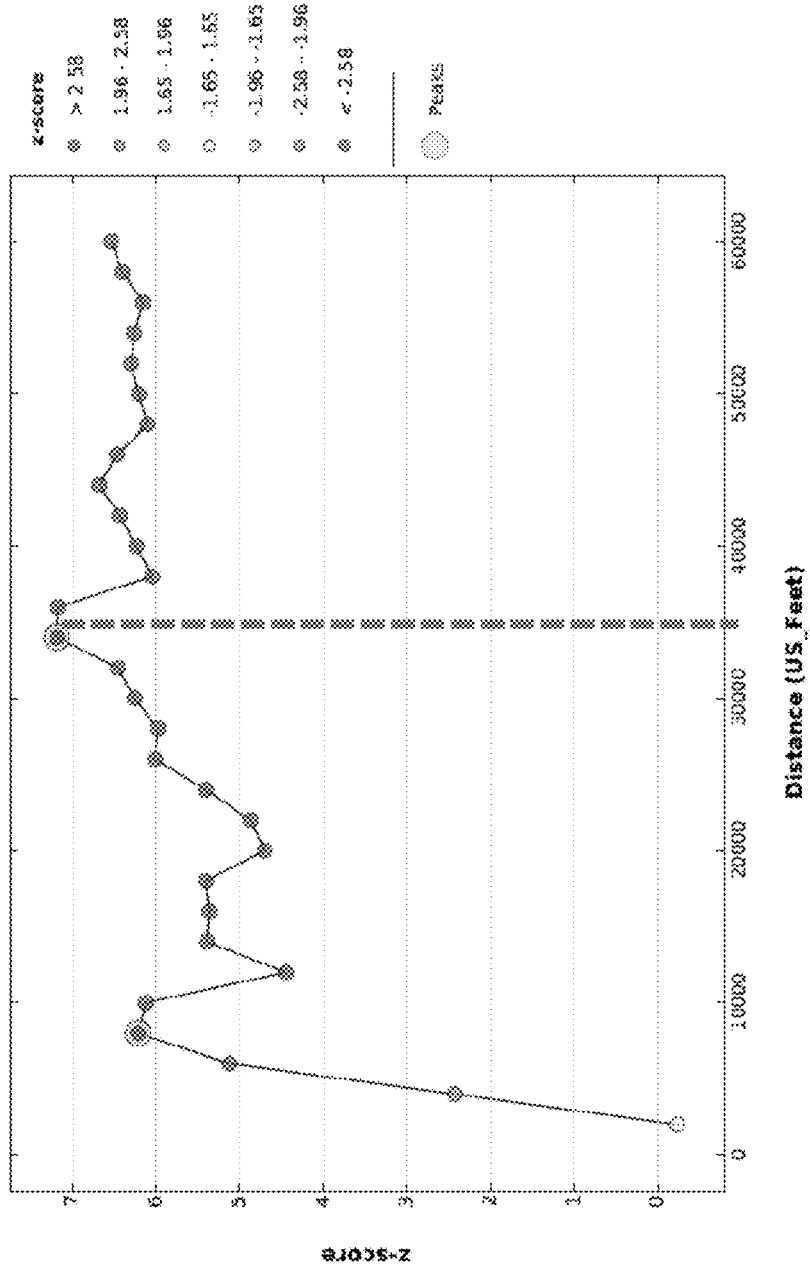
FIG. 23 illustrates an example spatial autocorrelation analysis, in accordance with one or more implementations.

In an example, FIG. 20 illustrates an example spatial autocorrelation analysis, in accordance with one or more implementations. As illustrated, the graph depicts 12 month cumulative production where maximum autocorrelation exists between about 2.3 miles and 4.6 miles, depicted by the two lines. FIG. 21 illustrates an example spatial autocorrelation analysis, in accordance with one or more implementations. As illustrated, the graph depicts a spatial autocorrelation of a production parameter, SWT, where maximum autocorrelation is between about 4.6 to about 8.3 miles, depicted by the two lines. FIG. 22 illustrates an example spatial autocorrelation analysis, in accordance with one or more implementations. As illustrated, the graph depicts a spatial autocorrelation of a production parameter, gross, where maximum autocorrelation is between about 4.5 to about 8.0 miles, depicted by the two lines. FIG. 23 illustrates an example spatial autocorrelation analysis, in accordance with one or more implementations. As illustrated, the graph depicts a spatial autocorrelation of a production parameter, mixed facies NTG, where maximum autocorrelation is at about 6.6 miles, depicted by the one line.

Figure 24:
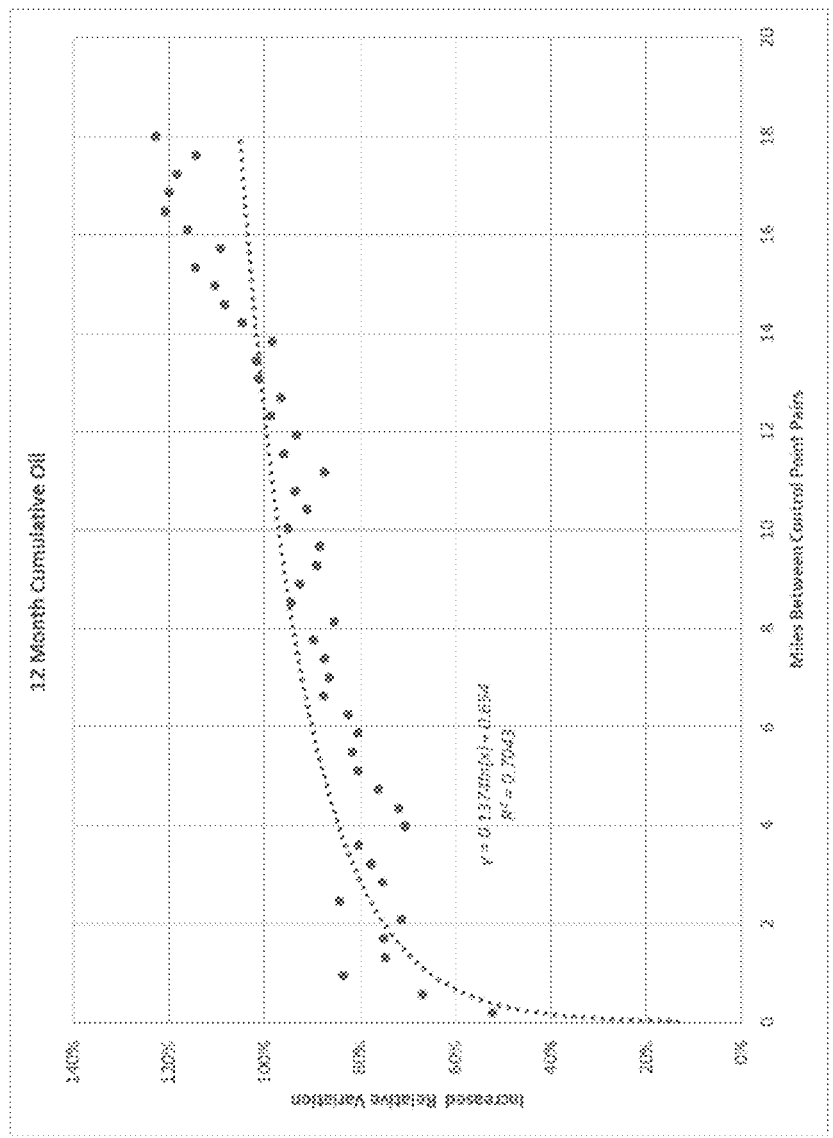
FIG. 24 illustrates an example variogram analysis, in accordance with one or more implementations.
Figure 25:
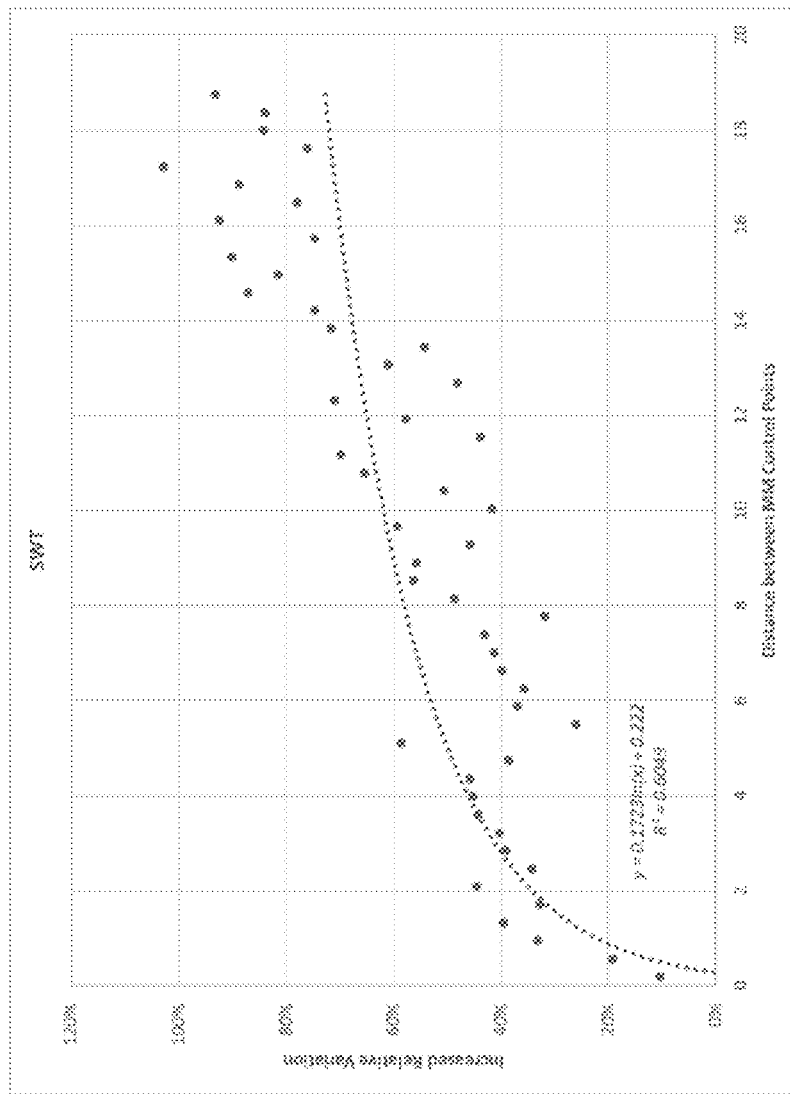
FIG. 25 illustrates an example variogram analysis, in accordance with one or more implementations.

FIG. 24 illustrates an example variogram analysis, in accordance with one or more implementations. As illustrated, the graph depicts a variogram of 12-month cumulative oil production. A relative coefficient of variation increases as a distance between control point pairs increases. The coefficient of variation is greater than about 60% at less than about 0.5 miles between the control point pairs. FIG. 25 illustrates an example variogram analysis, in accordance with one or more implementations. As illustrated, the graph depicts a variogram of a production parameter, SWT. The coefficient of variation reaches about 30% at about 3 miles, depicting less variation of SWT as the distance between control point pairs increases.

While particular implementations are described above, it will be understood it is not intended to limit the presently disclosed technology to these particular implementations. On the contrary, the presently disclosed technology includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as to not unnecessarily obscure aspects of the implementations.

The terminology used in the description of the presently disclosed technology herein is for the purpose of describing particular implementations only and is not intended to be limiting of the presently disclosed technology. As used in the description of the presently disclosed technology and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the corresponding listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the presently disclosed technology to the precise forms disclosed. Many modifications and variations are possible in view of the above teachings. The implementations were chosen and described in order to best explain the principles of the presently disclosed technology and its practical applications, to thereby enable others skilled in the art to best utilize the presently disclosed technology and various implementations with various modifications as are suited to the particular use contemplated.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer-implemented method of estimating a likelihood of reservoir productivity as a function of position in a subsurface volume of interest, the method being implemented in a computer system that includes one or more physical computer processors, non-transient electronic storage, and a display, comprising:

obtaining, from the non-transient electronic storage, subsurface data and well data of the subsurface volume of interest, wherein the subsurface data and the well data include production parameter values for multiple production parameters as a function of position in the subsurface volume of interest, thereby characterizing subsurface production features that affect the reservoir productivity;

obtaining, from the non-transient electronic storage, a parameter model, the parameter model having been conditioned by training an initial parameter model using training data, wherein the training data includes (i) the well data of one or more wells in the subsurface volume of interest, and (ii) the production parameter values for corresponding multiple production parameters affecting productivity of the one or more wells as a function of position in the subsurface volume of interest;

obtaining, from the non-transient electronic storage, a spatial correlation model, the spatial correlation model comprising a spatial autocorrelation and variograms of the subsurface volume of interest, positive spatial autocorrelation corresponding to positions in the subsurface volume of interest where wells having similar productivity are spatially clustered together and negative spatial autocorrelation corresponding to positions in the subsurface volume of interest where wells are randomly distributed, the variograms indicating variation in heterogeneity of the subsurface volume of interest as a function of position in the subsurface volume of interest;

using, with the one or more physical computer processors, the subsurface data and the well data to generate multiple production parameter maps, wherein a given production parameter map represents the production parameter values for the given production parameter as a function of time and position in the subsurface volume of interest;

applying, with the one or more physical computer processors, the parameter model to the multiple production parameter maps to generate production likelihood values specifying likelihoods of reservoir productivity as a function of position in the subsurface volume of interest;

applying, with the one or more physical computer processors, the spatial correlation model to the subsurface data and the well data to generate parameter continuity values specifying changes in the production parameters and reservoir productivity as a function of position in the subsurface volume of interest;

generating, with the one or more physical computer processors, a representation of the likelihood of reservoir productivity as a function of position in the subsurface volume of interest using visual effects to depict at least a portion of the production likelihood values and the parameter continuity values as a function of position in the subsurface volume of interest, wherein an area of intersection between the visual effects depicting the at least the portion of the production likelihood values and the parameter continuity values identifies a zone of reservoir continuity; and displaying, via the graphical user interface, the representation.

2. The computer-implemented method of claim 1, further comprising:
limiting, with the one or more physical computer processors, the production likelihood values based on the production likelihood values exceeding a threshold value to generate limited production likelihood values;
limiting, with the one or more physical computer processors, the parameter continuity values based on the parameter continuity values exceeding a threshold value to generate limited parameter continuity values;
generating, with the one or more physical computer processors, a refined representation of the likelihood of reservoir productivity as a function of position in the subsurface volume of interest using visual effects to depict at least a portion of the limited production likelihood values and the limited parameter continuity values as a function of position in the subsurface volume of interest; and
displaying, via the graphical user interface, the refined representation.

3. The computer-implemented method of claim 1, wherein the subsurface production features comprise one or more petrophysical, core, cutting, pressure, drilling property, mudlog, seismic features, well perforation lengths, proppant intensity, fluid types, well spacing, and number of fracturing stages.

4. The computer-implemented method of claim 1, wherein applying the parameter model to the multiple production parameter maps comprises:
applying, with the one or more physical computer processors, the parameter model to the multiple production parameter maps to generate multiple refined production parameters comprising refined production parameter values, wherein the multiple refined production parameters are a subset of the multiple production parameters;
generating, with the one or more physical computer processors, multiple production parameter graphs from the refined production parameter values, wherein a given refined production parameter graph specifies refined production parameter values corresponding to a given refined production parameter as a function of estimated well productivity;
generating constrained production parameters comprising constrained production parameter values based on thresholds in the multiple production parameter graphs, wherein the constrained production parameter values include a subset of the refined production parameter values; and
generating the production likelihood values using the refined production parameter values.

5. The computer-implemented method of claim 1, wherein the parameter model comprises random forest machine learning.

6. The computer-implemented method of claim 2, wherein the limited parameter continuity values comprise a likelihood of similarity of the production parameters and the reservoir productivity as a function of position in the subsurface volume of interest compared to production parameters and reservoir productivity of existing wells.

7. A computer-implemented method of estimating a likelihood of reservoir productivity as a function of position in a subsurface volume of interest, comprising:
obtaining, from the non-transient electronic storage, subsurface data and well data of the subsurface volume of interest, wherein the subsurface data and the well data include production parameter values for multiple production parameters as a function of position in the subsurface volume of interest, thereby characterizing subsurface production features that affect the reservoir productivity;
obtaining, from the non-transient electronic storage, a parameter model, the parameter model having been conditioned by training an initial parameter model using training data, wherein the training data includes (i) the well data of one or more wells in the subsurface volume of interest, and (ii) the production parameter values for corresponding multiple production parameters affecting productivity of the one or more wells as a function of position in the subsurface volume of interest;
obtaining, from the non-transient electronic storage, a spatial correlation model, the spatial correlation model comprising a spatial autocorrelation and variograms of the subsurface volume of interest, positive spatial autocorrelation corresponding to positions in the subsurface volume of interest where wells having similar productivity are spatially clustered together and negative spatial autocorrelation corresponding to positions in the subsurface volume of interest where wells are randomly distributed, the variograms indicating variation in heterogeneity of the subsurface volume of interest as a function of position in the subsurface volume of interest;
using, with the one or more physical computer processors, the subsurface data and the well data to generate multiple production parameter maps, wherein a given production parameter map represents the production parameter values for the given production parameter as a function of time and position in the subsurface volume of interest;
applying, with the one or more physical computer processors, the parameter model to the multiple production parameter maps to generate production likelihood values specifying likelihoods of reservoir productivity as a function of position in the subsurface volume of interest;
applying, with the one or more physical computer processors, the spatial correlation model to the subsurface data and the well data to generate parameter continuity values specifying changes in the production parameters and reservoir productivity as a function of position in the subsurface volume of interest;
generating, with the one or more physical computer processors, a first representation of the likelihood of reservoir productivity as a function of position in the subsurface volume of interest using visual effects to depict at least a portion of the production likelihood values and the parameter continuity values as a function of position in the subsurface volume of interest, wherein an area of intersection between the visual effects depicting the at least the portion of the production likelihood values and the parameter continuity values identifies a zone of reservoir continuity; and
displaying, via the graphical user interface, the first representation.

8. The computer-implemented method of claim 7, further comprising:
limiting, with the one or more physical computer processors, the production likelihood values based on the production likelihood values exceeding a threshold value to generate limited production likelihood values;

limiting, with the one or more physical computer processors, the parameter continuity values based on the parameter continuity values exceeding a threshold value to generate limited parameter continuity values;

generating, with the one or more physical computer processors, a refined second representation of the likelihood of reservoir productivity as a function of position in the subsurface volume of interest using visual effects to depict at least a portion of the limited production likelihood values and the limited parameter continuity values as a function of position in the subsurface volume of interest; and displaying, via the graphical user interface, the refined second representation.

9. The computer-implemented method of claim 8, wherein the limited parameter continuity values comprise a likelihood of similarity of the production parameters and the reservoir productivity as a function of position in the subsurface volume of interest compared to production parameters and reservoir productivity of existing wells.

10. The computer-implemented method of claim 7, wherein the subsurface production features comprise one or more petrophysical, core, cutting, pressure, drilling property, mudlog, seismic features, well perforation lengths, proppant intensity, fluid types, well spacing, and number of fracturing stages.

11. The computer-implemented method of claim 7, wherein the parameter model is trained using training data on an initial parameter model, wherein the training data includes (i) multiple well production parameters and (ii) well data corresponding to the multiple well production parameters.

12. The computer-implemented method of claim 7, wherein the parameter model comprises random forest machine learning.

13. A system for estimating a likelihood of reservoir productivity as a function of position in a subsurface volume of interest, the system comprising:

non-transient electronic storage;
a graphical user interface; and
one or more hardware processors configured by machine-readable instructions to:

obtain, from the non-transient electronic storage, subsurface data and well data of the subsurface volume of interest, wherein the subsurface data and the well data include production parameter values for multiple production parameters as a function of position in the subsurface volume of interest, thereby characterizing subsurface production features that affect the reservoir productivity;

obtain, from the non-transient electronic storage, a parameter model, the parameter model having been conditioned by training an initial parameter model using training data, wherein the training data includes (i) the well data of one or more wells in the subsurface volume of interest, and (ii) the production parameter values for corresponding multiple production parameters affecting productivity of the one or more wells as a function of position in the subsurface volume of interest;

obtain, from the non-transient electronic storage, a spatial correlation model, the spatial correlation model comprising a spatial autocorrelation and variograms of the subsurface volume of interest, positive spatial autocorrelation corresponding to positions in the subsurface volume of interest where wells having similar productivity are spatially clustered together and negative spatial autocorrelation corresponding to positions in the subsurface volume of interest where wells are randomly distributed, the variograms indicating variation in heterogeneity of the subsurface volume of interest as a function of position in the subsurface volume of interest;

use, with the one or more physical computer processors, the subsurface data and the well data to generate multiple production parameter maps, wherein a given production parameter map represents the production parameter values for the given production parameter as a function of time and position in the subsurface volume of interest;

apply, with the one or more physical computer processors, the parameter model to the multiple production parameter maps to generate production likelihood values specifying likelihoods of reservoir productivity as a function of position in the subsurface volume of interest;

apply, with the one or more physical computer processors, the spatial correlation model to the subsurface data and the well data to generate parameter continuity values specifying changes in the production parameters and reservoir productivity as a function of position in the subsurface volume of interest;

generate, with the one or more physical computer processors, a representation of the likelihood of reservoir productivity as a function of position in the subsurface volume of interest using visual effects to depict at least a portion of the production likelihood values and the parameter continuity values as a function of position in the subsurface volume of interest, wherein an area of intersection between the visual effects depicting the at least the portion of the production likelihood values and the parameter continuity values identifies a zone of reservoir continuity; and display, via the graphical user interface, the representation.

14. The system of claim 13, wherein the one or more hardware processors are further configured by machine-readable instructions to:

limit, with the one or more physical computer processors, the production likelihood values based on the production likelihood values exceeding a threshold value to generate limited production likelihood values;

limit, with the one or more physical computer processors, the parameter continuity values based on the parameter continuity values exceeding a threshold value to generate limited parameter continuity values;

generate, with the one or more physical computer processors, a refined representation of the likelihood of reservoir productivity as a function of position in the subsurface volume of interest using visual effects to depict at least a portion of the limited production likelihood values and the limited parameter continuity values as a function of position in the subsurface volume of interest; and display, via the graphical user interface, the refined representation.

15. The system of claim 13, wherein the parameter model is trained using training data on an initial parameter model, wherein the training data includes (i) multiple well production parameters and (ii) well data corresponding to the multiple well production parameters, and wherein the parameter model and the initial parameter model comprise random forest machine learning.

* * * * *